(12) United States Patent
Weber

(10) Patent No.: US 7,488,007 B2
(45) Date of Patent: Feb. 10, 2009

(54) SLIP FIT QUICK DISCONNECT PIPE COUPLER

(76) Inventor: Walter L. Weber, 8417 New Hampshire, St. Louis, MO (US) 63123

( * ) Notice: Subject to any disclaimer, the term of this patent is extended or adjusted under 35 U.S.C. 154(b) by 216 days.

(21) Appl. No.: 11/437,451

(22) Filed: May 18, 2006

(65) Prior Publication Data

US 2006/0279079 A1    Dec. 14, 2006

Related U.S. Application Data

(60) Provisional application No. 60/683,233, filed on May 20, 2005, provisional application No. 60/763,043, filed on Jan. 27, 2006.

(51) Int. Cl.
*F16L 19/02* (2006.01)
(52) U.S. Cl. ............ 285/325; 285/39; 285/67; 285/330
(58) Field of Classification Search .......... 285/39, 285/67, 70, 189, 325, 330
See application file for complete search history.

(56) References Cited

U.S. PATENT DOCUMENTS

| | | | |
|---|---|---|---|
| 295,151 A * | 3/1884 | Cummins | 285/325 |
| 531,071 A * | 12/1894 | Stahley | 285/325 |
| 686,571 A * | 11/1901 | Wilson | 285/67 |
| 823,346 A * | 6/1906 | Maxwell | 285/325 |
| 2,706,649 A | 4/1955 | Foushee | |
| 3,645,333 A * | 2/1972 | Maass | 166/85.2 |
| 3,812,910 A * | 5/1974 | Wellstein | 166/85.2 |
| 3,869,000 A * | 3/1975 | English | 166/380 |
| 3,966,240 A | 6/1976 | Enomoto | |
| 4,037,654 A * | 7/1977 | Lien | 166/85.2 |
| 4,534,585 A | 8/1985 | Salinger | |
| 4,687,056 A | 8/1987 | Doering | |
| 4,858,958 A | 8/1989 | Harbeke | |
| 4,886,426 A * | 12/1989 | Surinak | 417/360 |
| 5,997,046 A * | 12/1999 | Hoeptner, III | 285/27 |
| 6,050,615 A | 4/2000 | Weinhold | |
| 6,120,065 A | 9/2000 | Chen | |
| 6,311,770 B1 | 11/2001 | Mullis | |
| 6,840,548 B2 | 1/2005 | Lacroix | |
| D531,283 S * | 10/2006 | Weber | 23/262 |
| 2002/0195820 A1 | 12/2002 | Surjaatmadja | |
| 2003/0116968 A1 | 6/2003 | Dallai, et al. | |
| 2004/0239116 A1 | 12/2004 | Cooke | |
| 2005/0035597 A1 | 2/2005 | Bamberger et al. | |

* cited by examiner

*Primary Examiner*—Aaron M Dunwoody
*Assistant Examiner*—Fannie Kee
(74) *Attorney, Agent, or Firm*—Kevin L. Klug; Draftsman David W. McGuire

(57) ABSTRACT

A slip fit quick disconnect pipe coupler having an insertion portion and a housing portion which mate to form a sealed coupling between pipes. The insertion portion and housing portion are separable to decouple the pipes.

20 Claims, 38 Drawing Sheets ively provided by General Electric Plastics. The insertion portion positively locks with a bridge of said housing via an overhanging lip.

SLIP FIT QUICK DISCONNECT PIPE COUPLER

This application claims priority of U.S. Provisional Patent Applications #60/683,233, filed May 20, 2005, entitled Slip Fit Quick Disconnect Pipe Coupler and #60/763,043 filed Jan. 27, 2006, entitled Slip Fit Quick Disconnect Pipe Decoupling Tool.

BACKGROUND OF THE INVENTION

The art of the present invention relates to pipe couplers in general and more particularly to an improved slip fitting pipe coupler having a housing and insertion portion which is capable of inline coupling of pressurized pipes and further capable of quick disconnection without the use of specialized tools. The device and method of use represents an improvement over the prior art, often known as a pitless adaptor or pipe union, by providing a unique and quick pipe coupling and decoupling which does not require the use of pipe or other types of wrenches and may be manufactured at less cost, uniquely from polymers such as the NORYL® material from General Electric Plastics. The insertion portion positively locks with a bridge of said housing via an overhanging lip.

Within septic pump tanks, wells, cisterns, sumps, industrial pits, and other liquid storage facilities, submersible or other types of pumps or other components are often suspended within or near a liquid, typically water, and connected via piping through the side walls of the aforesaid. Often a supply pipe is connected substantially vertically with said pump and then diverted (often substantially perpendicularly) through said side walls as an exiting or effluent pipe. In the aforesaid applications, it is desirable to quickly and easily remove said pump and supply pipe, without specialty tools, and without the necessity of a plumbing technician leaning or crawling into the aforesaid. The present art provides the desirable removal advantages via utilization of a simple, preferably L-shaped, removal or decoupling tool. The present art may be utilized as a quick pipe coupler in any pipe coupling application and in any orientation, including but not limited to horizontal, vertical, parallel, or combinations thereof.

Removing the aforesaid pumps or other components from the aforesaid locations requires an easily detached slip fit pipe coupling adaptor. Prior art devices such as described in U.S. Pat. No. 6,311,770 issued Nov. 6, 2001 to Mullis, entitled: Pitless Adapter Assembly utilize a right angle adaptor with a slip fit which requires threaded insertion and mating of a pull pipe for removal. This prior art design by necessity is manufactured from a cast bronze or other non corrosive metallic material in order to provide the coupling strength for the embodiments described. The present art with its overhanging lip structure allows for inexpensive manufacturing via a molding process from polymers, such as the NORYL® material described, without sacrifice of mechanical strength. Also, unlike the prior art, the present art slip fit utilizes a double taper in both face breadth and channel/flange width which allows easy separation once initially separated with a simple removal tool. That is, the prior art channel and flange interface is not tapered and relies upon an elastomeric gasket (O-ring) to provide the necessary mating force. Unfortunately, when separating the prior art, the user must pull against this frictional force during the entire separation process. The present art tapered fit provides assured compression of the elastomeric gasket (O-ring) as the tapered portions seat and also allows for easy separation once the mating taper between the insertion portion and housing portion is initially separated. That is, the user is not required to pull against the frictional force created by the elastomeric gasket.

The present art further provides user convenience when removing the insertion portion from the housing portion with the aid of a simple removal tool. That is, the removal tool utilizes a simple L-shaped extension which is connected with a shaft. The L-shaped tool fits within an opening between a strap member on the insertion portion and a bridge on the housing portion which extends through an opening in the insertion portion. A simple cant of the shaft allows the tapered fit to de-couple or separate between the two portions. Thereafter, easy removal of the insertion portion along with the pump or other components and attached pipe is achieved via the L-shaped member pulling the strap member. The L-shaped member is simply withdrawn when the aforesaid is removed without the need to thread and unthread a pull pipe. In a preferred embodiment, the removal tool has a narrow diameter portion which engages with the strap member for positive engagement and removal. Said removal tool may take forms other than an L-shape in alternative embodiments, including but not limited to straight shaft sections.

Unlike the prior art, the present art provides an in-line coupling. The prior art is formed as a right-angle transition or pipe elbow. In many pipe coupling applications, in-line coupling is required. This necessity precludes utilization of the prior art. The inline coupling feature of the present art also allows a user to uncouple a straight line of pipe as well as utilize pipe elbows of various angles other than a right-angle for pipe coupling while providing the desired quick disconnection.

Accordingly, an object of the present invention is to provide a slip fit quick disconnect pipe coupler and method of use which promotes easily installation and quickly disconnection.

Another object of the invention is to provide a slip fit quick disconnect pipe coupler and method of use which may be utilized in any pipe coupling application including but not limited to septic pump tanks, wells, cisterns, sumps, industrial pits, and other liquid storage facilities.

A further object of the present invention is to provide a slip fit quick disconnect pipe coupler and method of use comprising an insertion portion which is easily removed from a housing portion.

A still further object of the invention is to provide a slip fit quick disconnect pipe coupler which may be inexpensively manufactured and/or molded from polymer materials and retain the strength necessary to couple pressurized pipes.

Another further object of the invention is to provide a slip fit quick disconnect pipe coupler and method of use which does not require specialized removal tools to separate the insertion portion from the housing portion.

A yet further object of the invention is to provide a slip fit quick disconnect pipe coupler and method of use which does not require a plumbing or other type of technician to lean or crawl into the space occupied by the coupler for installation or removal.

SUMMARY OF THE INVENTION

To accomplish the foregoing and other objects of this invention there is provided a slip fit quick disconnect pipe coupler and method of use for easy connection and disconnection of pipes. In a preferred embodiment, the coupler provides an in-line coupling whereas alternative embodiments may utilize angled coupling without departing from the scope and spirit of the present invention. The apparatus and method of use is especially suited for connection and repeated disconnection of pipes within septic pump tanks, wells, cisterns, sumps, industrial pits, and other liquid storage facilities but may be used in any pipe coupling application.

In its preferred form, the device is comprised of a housing portion and an insertion portion which mates with said housing portion. Each of the aforesaid have pipe coupling portions, preferably conventional ANSI tapered female pipe threads, into which the pipes to couple may be secured and sealed. Alternative embodiments may utilize male or female fittings as pipe coupling portions which are threaded or secured by other means such as adhesives, solders, or welds.

The housing portion has a uniquely double tapered channel circumferentially around an insertion opening into which said insertion portion fits. The width and breadth of said channel decreases substantially proportion to the distance from said insertion opening as it approaches a vertex intersection of said channel maximally away from said insertion opening. That is, the circumferential channel decreases to a minimal width at said vertex.

The insertion portion has a flange constructed to mate with said channel. That is, the flange width, breadth, and length is substantially equivalent to the width, breadth, and length of the housing portion channel. In a preferred embodiment, the insertion portion has a first face with a groove having an O-ring or elastomeric gasket, all of which mates with a second face on said housing portion. The unique channel width taper assures a force placement between said faces and onto said O-ring which is substantially perpendicular to said channel and which provides compression of said O-ring and assured sealing between the insertion and housing portion.

Although the tapered fit between the insertion and housing portions provides a secure holding action, unique to the delineated applications, retention of the respective portions is assured since the insertion opening is typically at a higher elevation than the channel vertex. That is in a preferred embodiment, since within a well, cistern, or sump application the supply pipe having a submerged pump is vertically connected with said pipe coupling portion on said insertion portion, gravitational force promotes continuous seating of the two portions. An alternative embodiment of the present art has a latch mechanism or assembly which assures a secure mating of the two portions in an inverted position.

In the preferred embodiment, the insertion portion has an integral strap member forming a substantial orifice into which a simple substantially L-shaped removal tool may be placed for separation of the two portions. Unique to the present invention, an opening within said orifice allows protrusion of a bridge on said housing portion into said orifice whereby a slight prying force of said removal tool will separate or "pop" the two portions apart. Once initially separated, the tapered fit is no longer placing said force to create O-ring compression and the two portions easily separate. This allows the plumbing technician or user to easily separate or "pop" the two portions apart and then simply lift the pump and supply pipe or other components without any additional force other than that caused by the weight of the supply pipe and pump. Prior art devices without this uniquely tapered mating configuration require the user to lift against the frictional interface for the full length of the slip coupling.

An alternative embodiment of said removal or decoupling tool is formed of a tubular steel with a substantially L-shape having a lever end and a decoupling end. Said decoupling end inserts into the pipe coupler orifice which allows the operator to apply force against the pipe coupler bridge of said pipe coupler, thereby decoupling said pipe coupler. Said decoupling end further comprises a strap member retainer and a ball. Said ball is of a weight and size which allows rolling of said ball within said tubular decoupling end. Said decoupling end further comprises a window on said inner surface to allow said strap member retainer to extend beyond an inner surface of said decoupling end. Said decoupling end further comprises pivot points whereby said strap member retainer is pivotally mounted. Said lever end is of sufficient length to allow an operator to apply adequate force for decoupling said pipe connecter and for extraction of said pipe components. Said lever end further comprises eyes or holes capable of accepting one or more handles. Said handles aid in applying addition force, or assist the operator in extracting said supply pipe after decoupling.

Operation of said decoupling tool is by means of canting said decoupling tool against a pipe coupler bridge, thereby applying force until decoupling take place. Gravitational force will cause said ball to roll against said strap member retainer, forcing said strap member retainer to an extended position. Once said strap member retainer is extended, the pipe coupler strap member is prevents the decoupling tool from slipping off said coupler. When said strap member retainer is retracted via an opposition cant said decoupling tool may be withdrawn, thereby securely extracting said supply pipe.

Although preferably molded from a one piece polymer material such as the NORYL® material from General Electric Plastics and fiberglass filled, the coupler apparatus may be manufactured from a variety of materials, including but not limited to woods, metals, composites, or ceramics without departing from the scope and spirit herein intended. Said manufacturing includes but is not limited to molding, machining, casting, forging, pressing, laminating, carving, or utilization of stereo-lithographic or electro-dynamic milling techniques. Said removal or decoupling tool may be manufactured from a plurality of materials including but not limited to solid and tubular metallic materials, plastics, resins, fiber filled materials, or woods.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
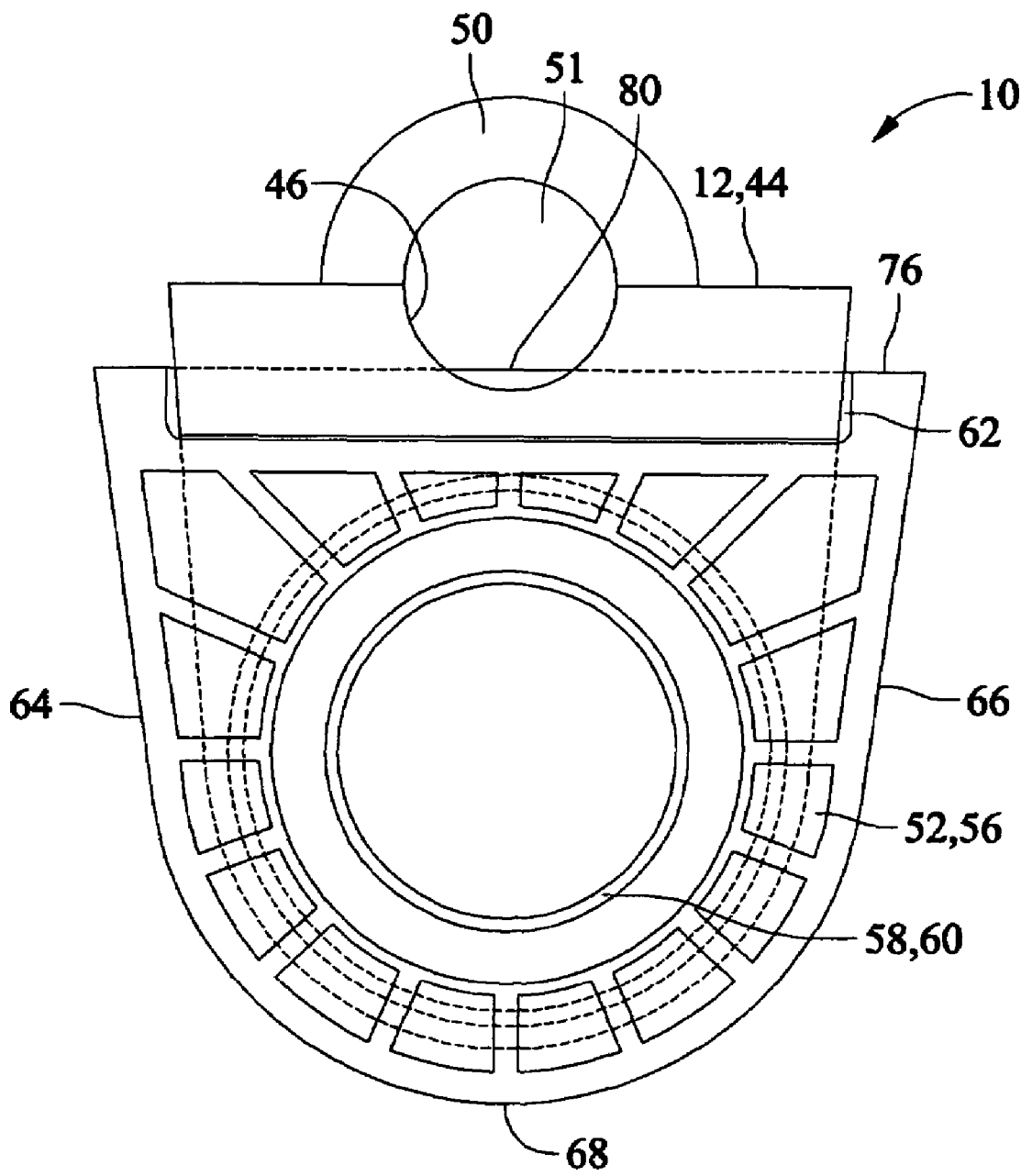
FIG. 1 is a front plan view of a the slip fit quick disconnect pipe coupler in an assembled form.
Figure 2:
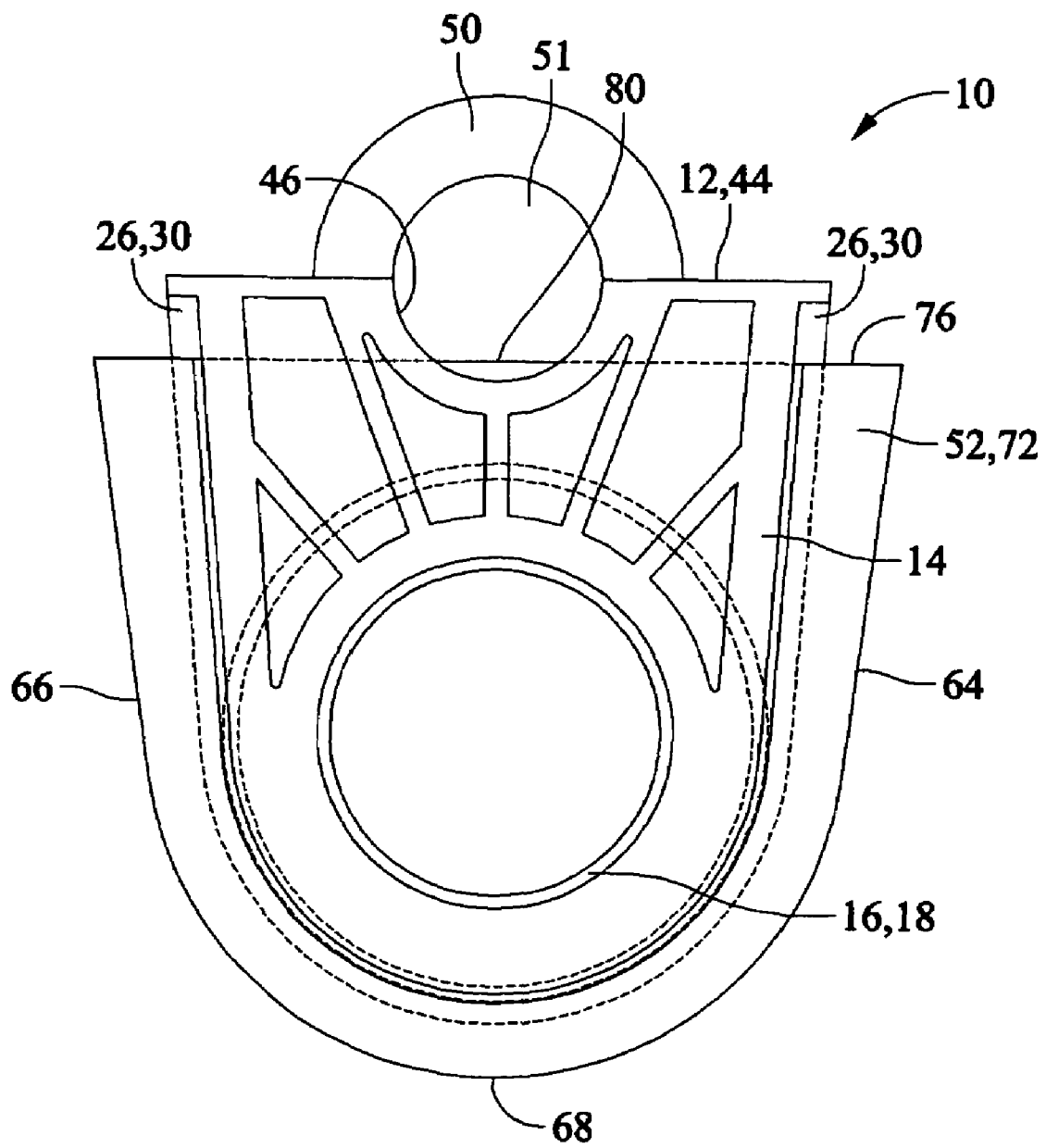
FIG. 2 is a rear plan view of the slip fit quick disconnect pipe coupler in an assembled form.
Figure 3:
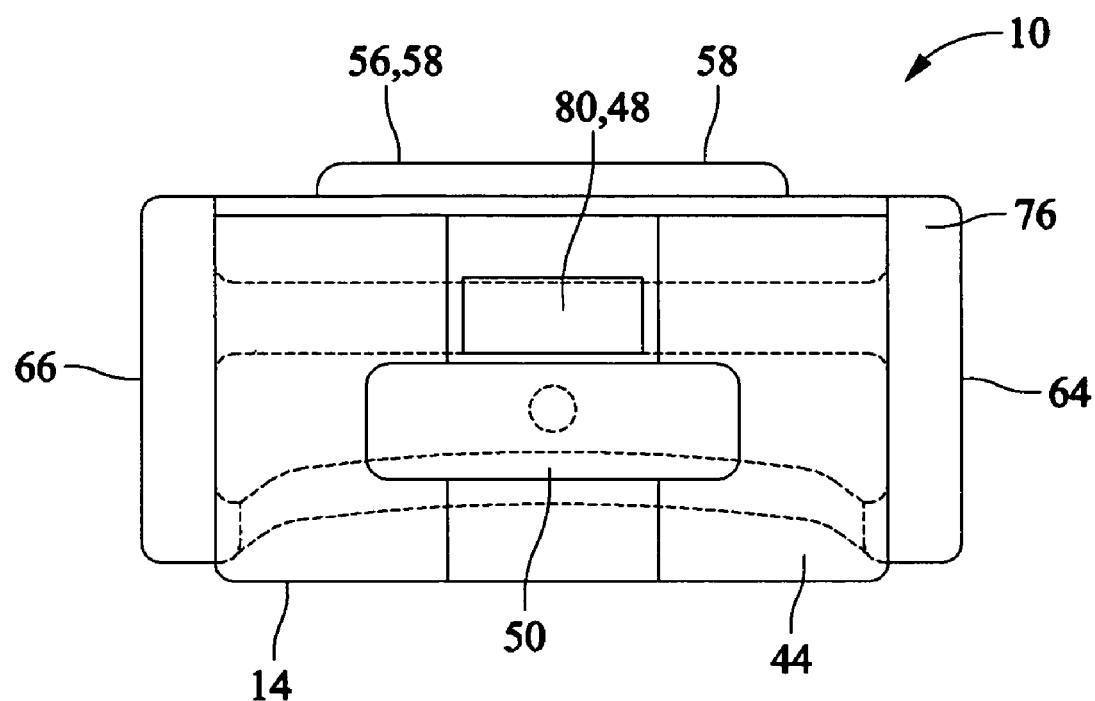
FIG. 3 is a top plan view of the slip fit quick disconnect pipe coupler in an assembled form.
Figure 4:
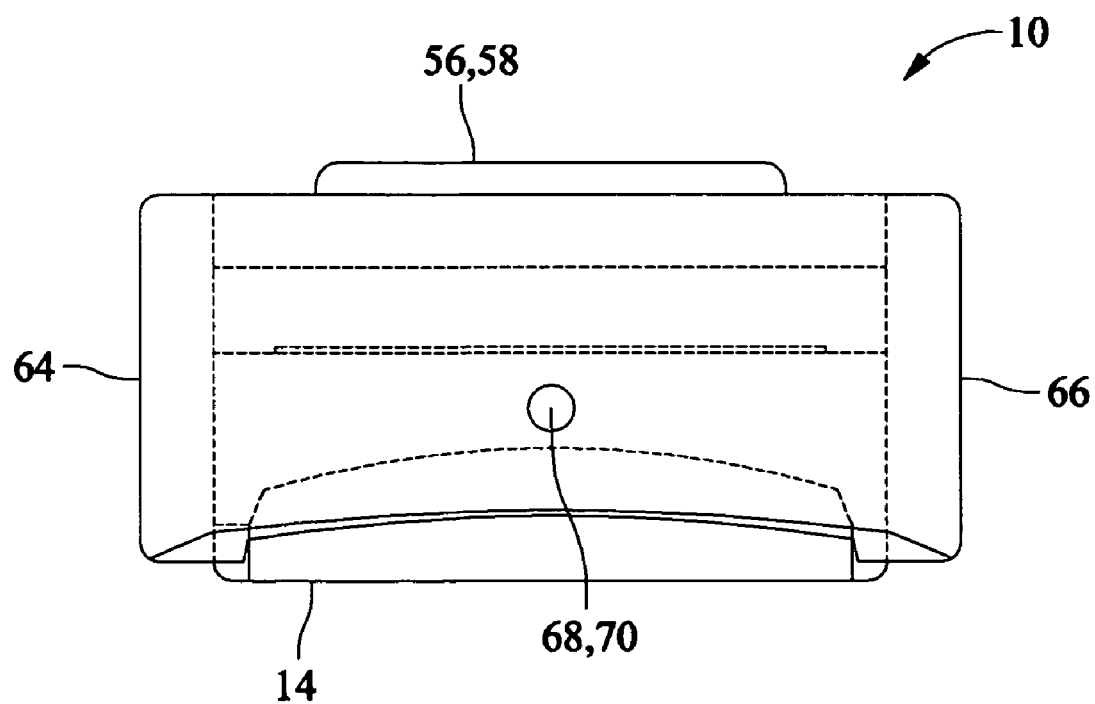
FIG. 4 is a bottom plan view of the slip fit quick disconnect pipe coupler in an assembled form.
Figure 5:
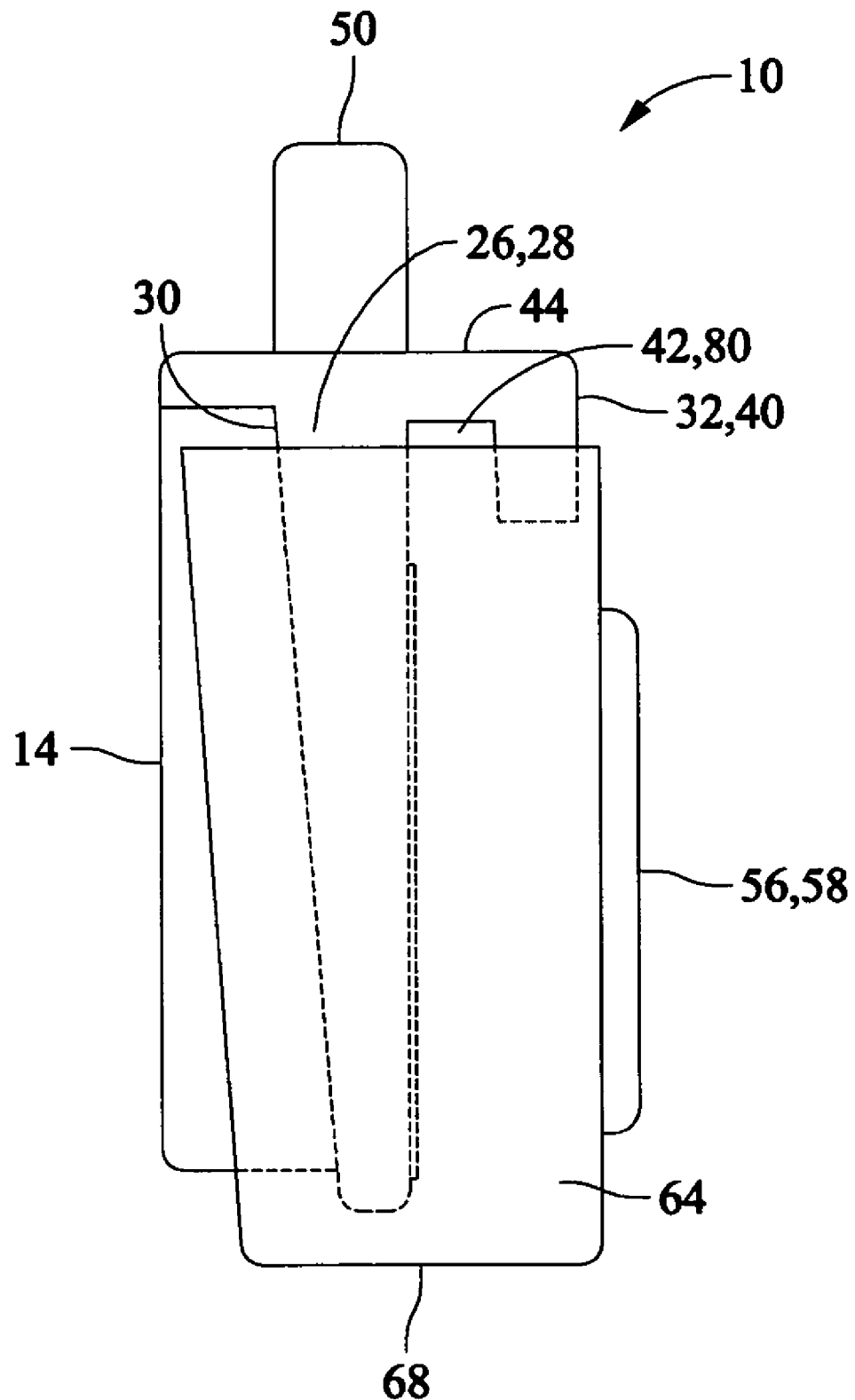
FIG. 5 is a left plan view of the slip fit quick disconnect pipe coupler in an assembled form with a right plan view being substantially symmetrical.
Figure 6:
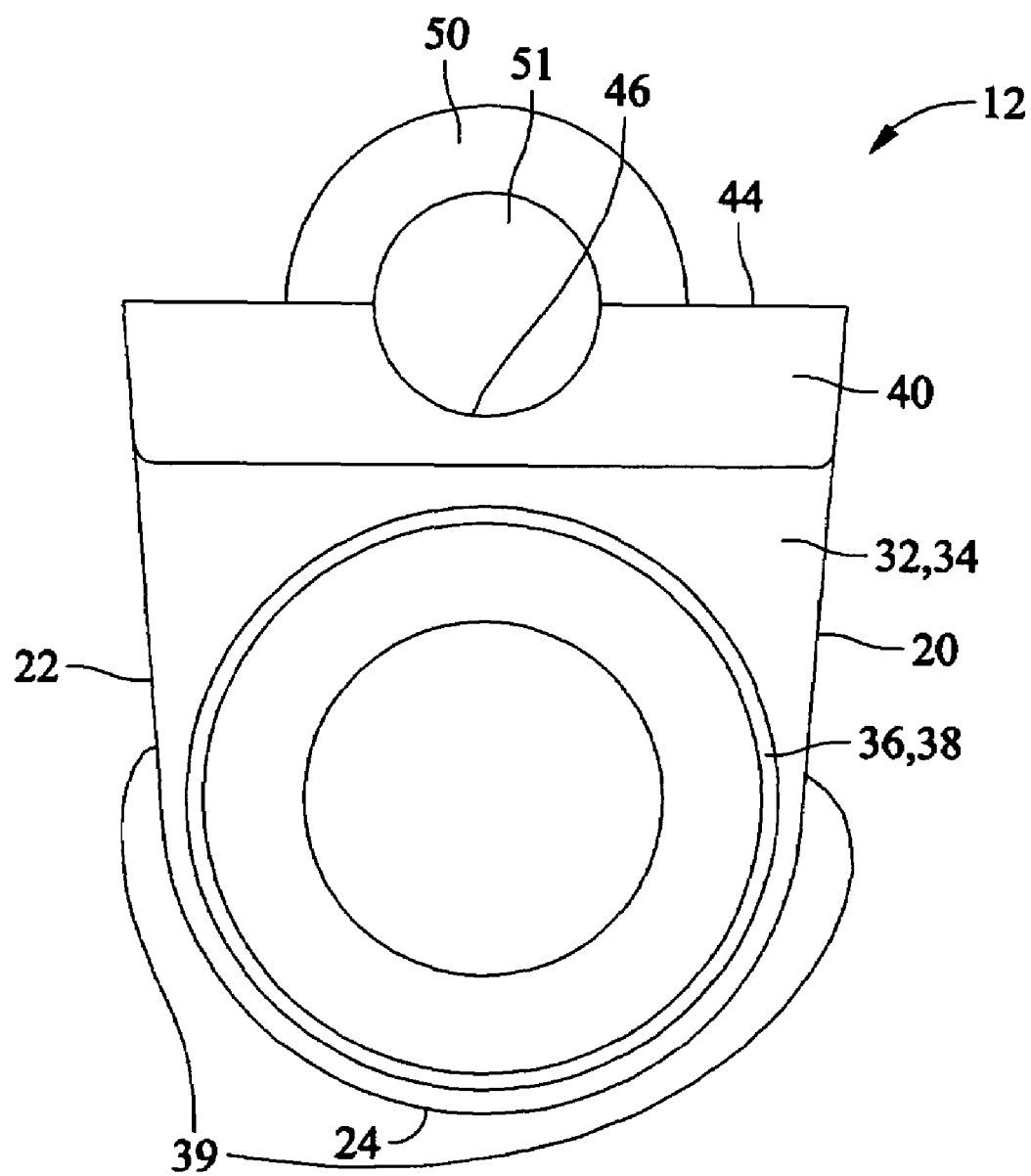
FIG. 6 is a front plan view of the insertion portion of the slip fit quick disconnect pipe coupler.
Figure 7:
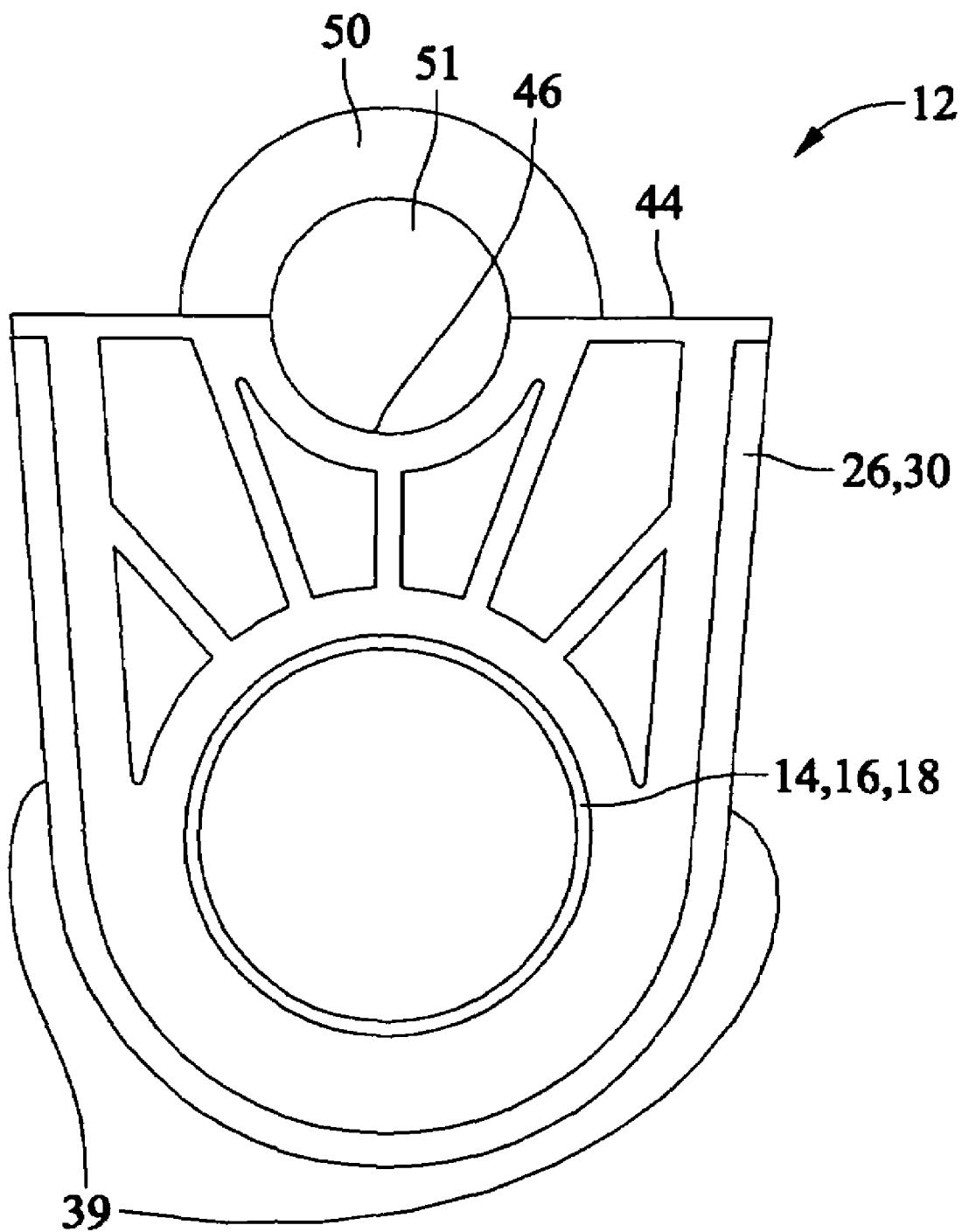
FIG. 7 is a rear plan view of the insertion portion of the slip fit quick disconnect pipe coupler.
Figure 8:
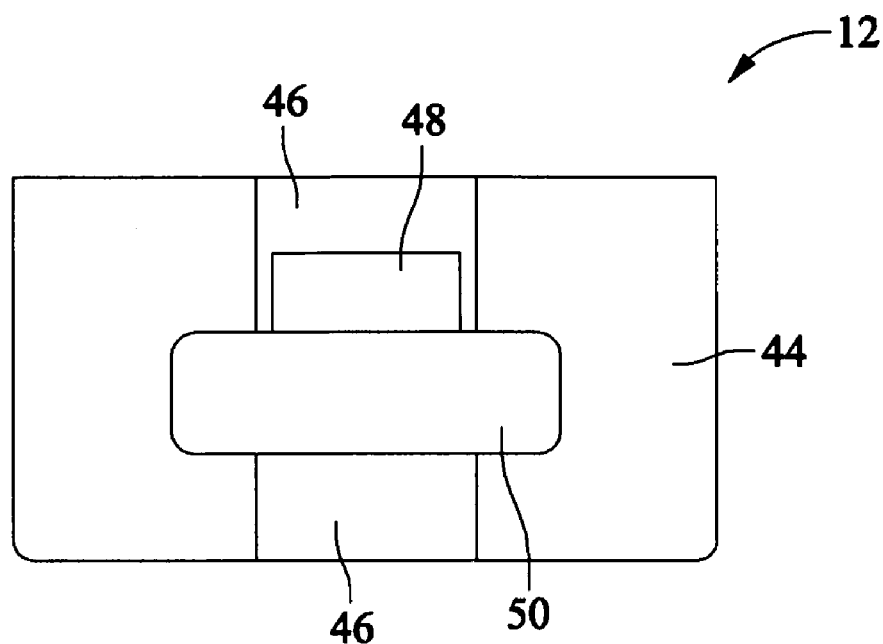
FIG. 8 is a top plan view of the insertion portion of the slip fit quick disconnect pipe coupler.
Figure 9:
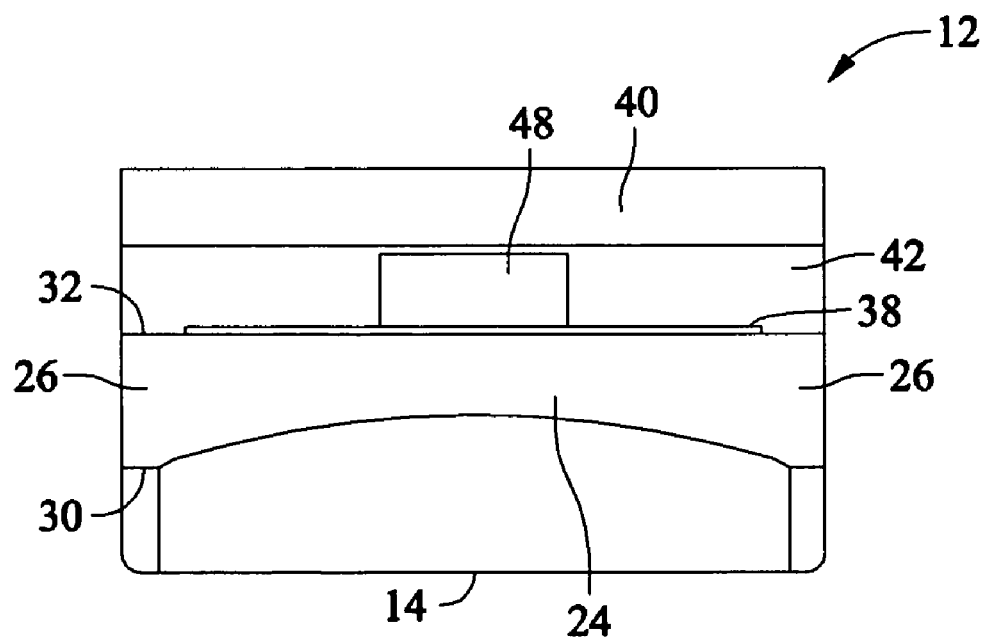
FIG. 9 is a bottom plan view of the insertion portion of the slip fit quick disconnect pipe coupler.
Figure 10:
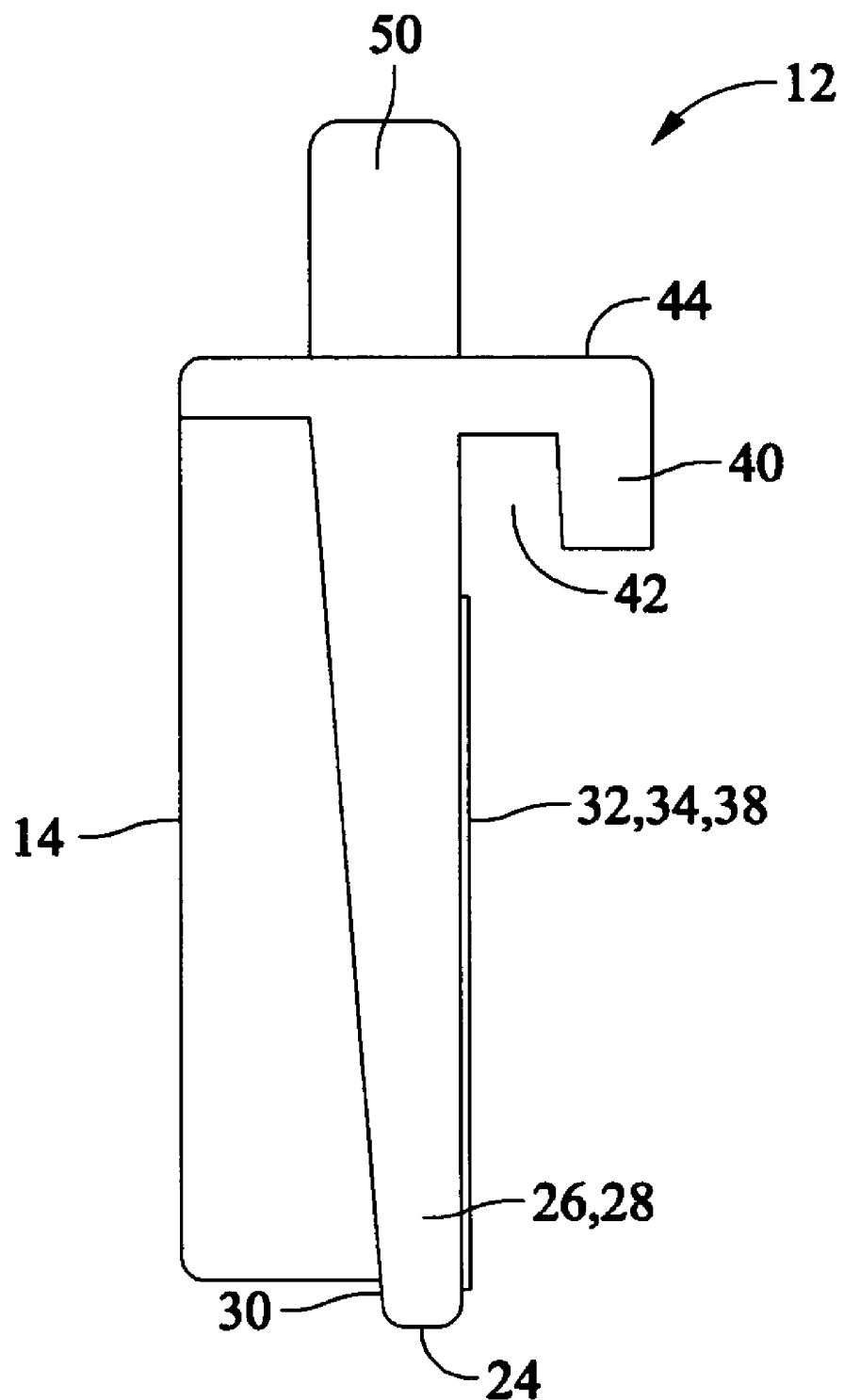
FIG. 10 is a left plan view of the insertion portion of the slip fit quick disconnect pipe coupler with a right plan view being substantially symmetrical.
Figure 11:
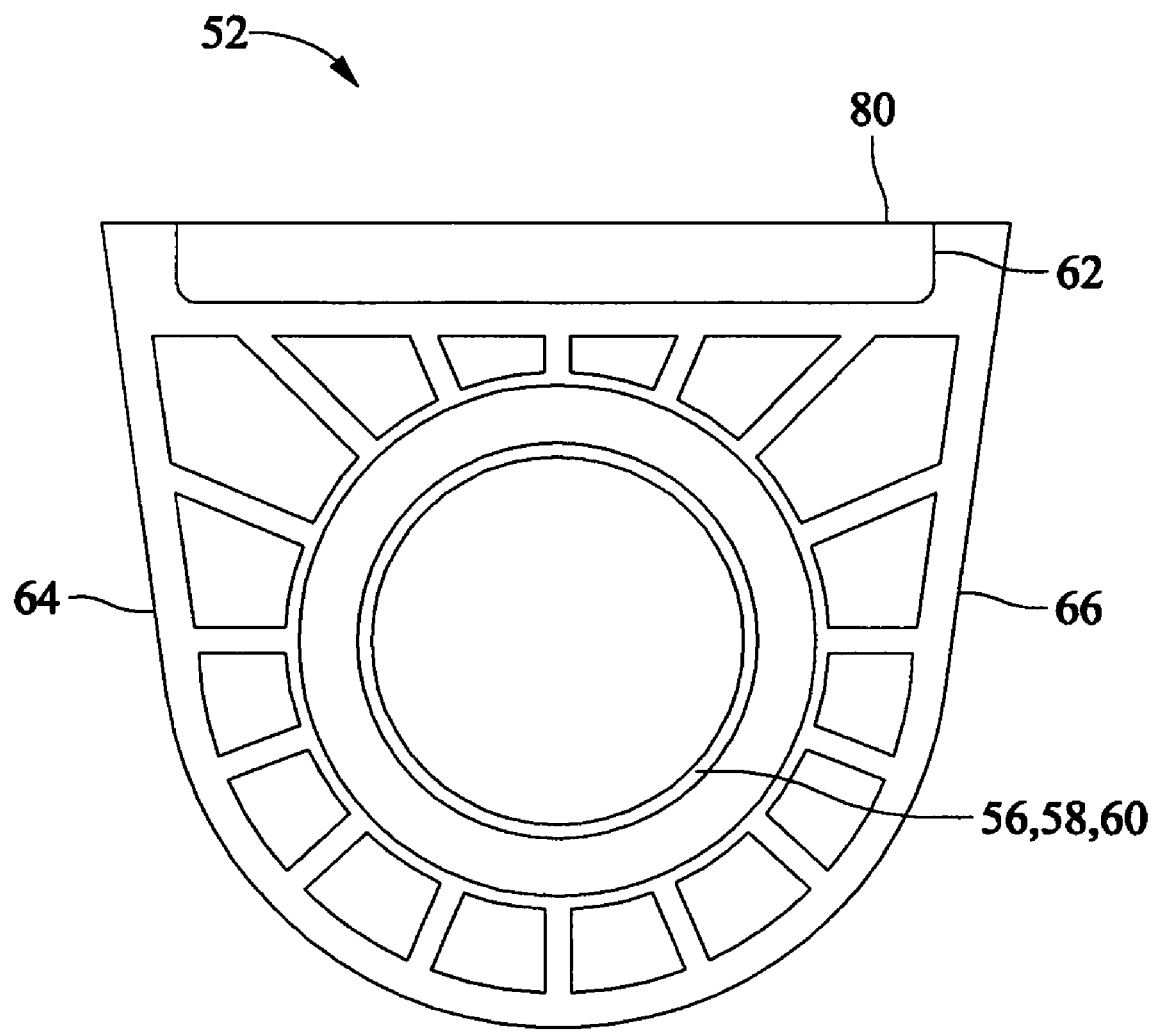
FIG. 11 is a front plan view of the housing portion of the slip fit quick disconnect pipe coupler.
Figure 12:
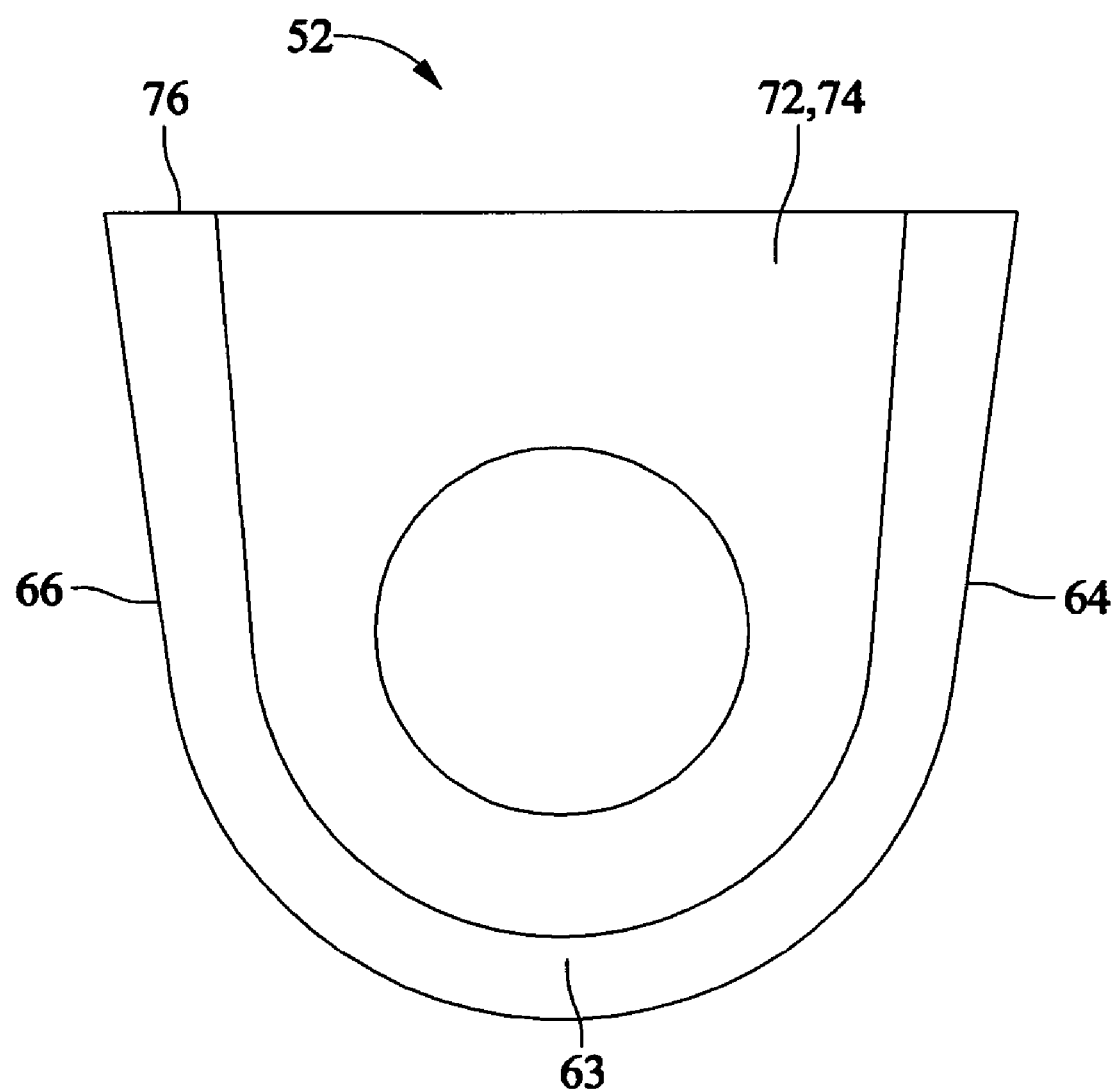
FIG. 12 is a rear plan view of the housing portion of the slip fit quick disconnect pipe coupler.
Figure 13:
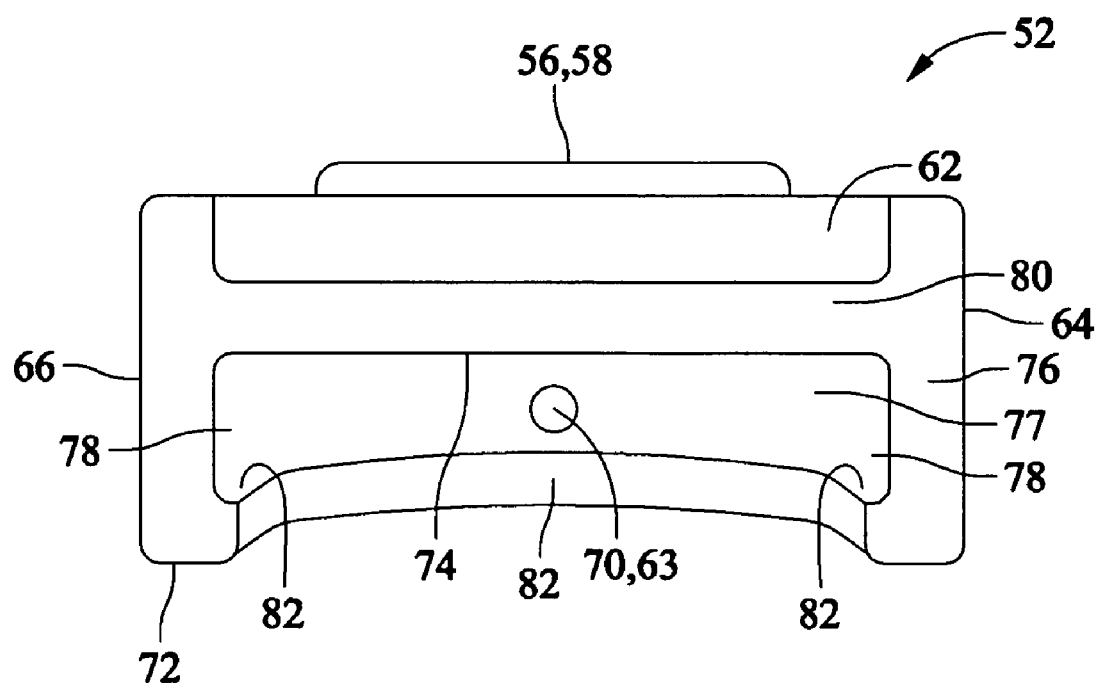
FIG. 13 is a top plan view of the housing portion of the slip fit quick disconnect pipe coupler.
Figure 14:
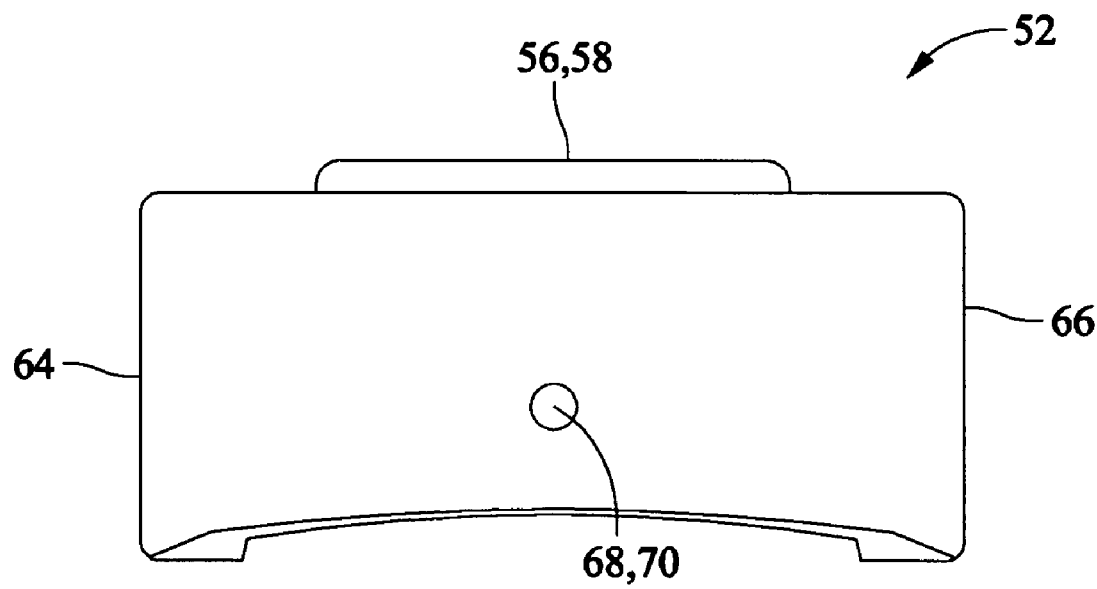
FIG. 14 is a bottom plan view of the housing portion of the slip fit quick disconnect pipe coupler.
Figure 15:
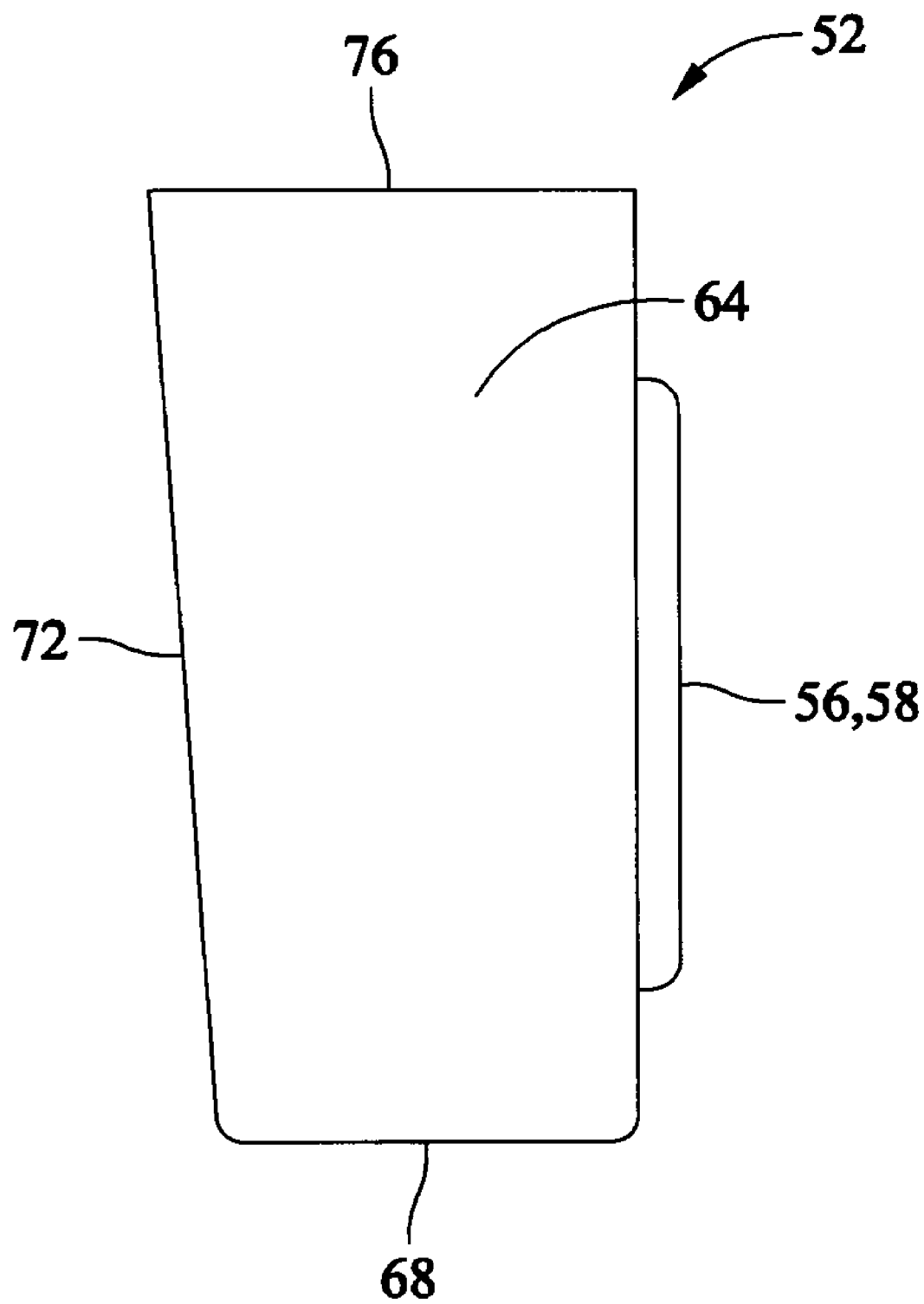
FIG. 15 is a left plan view of the housing portion of the slip fit quick disconnect pipe coupler with a right plan view being substantially symmetrical.
Figure 16:
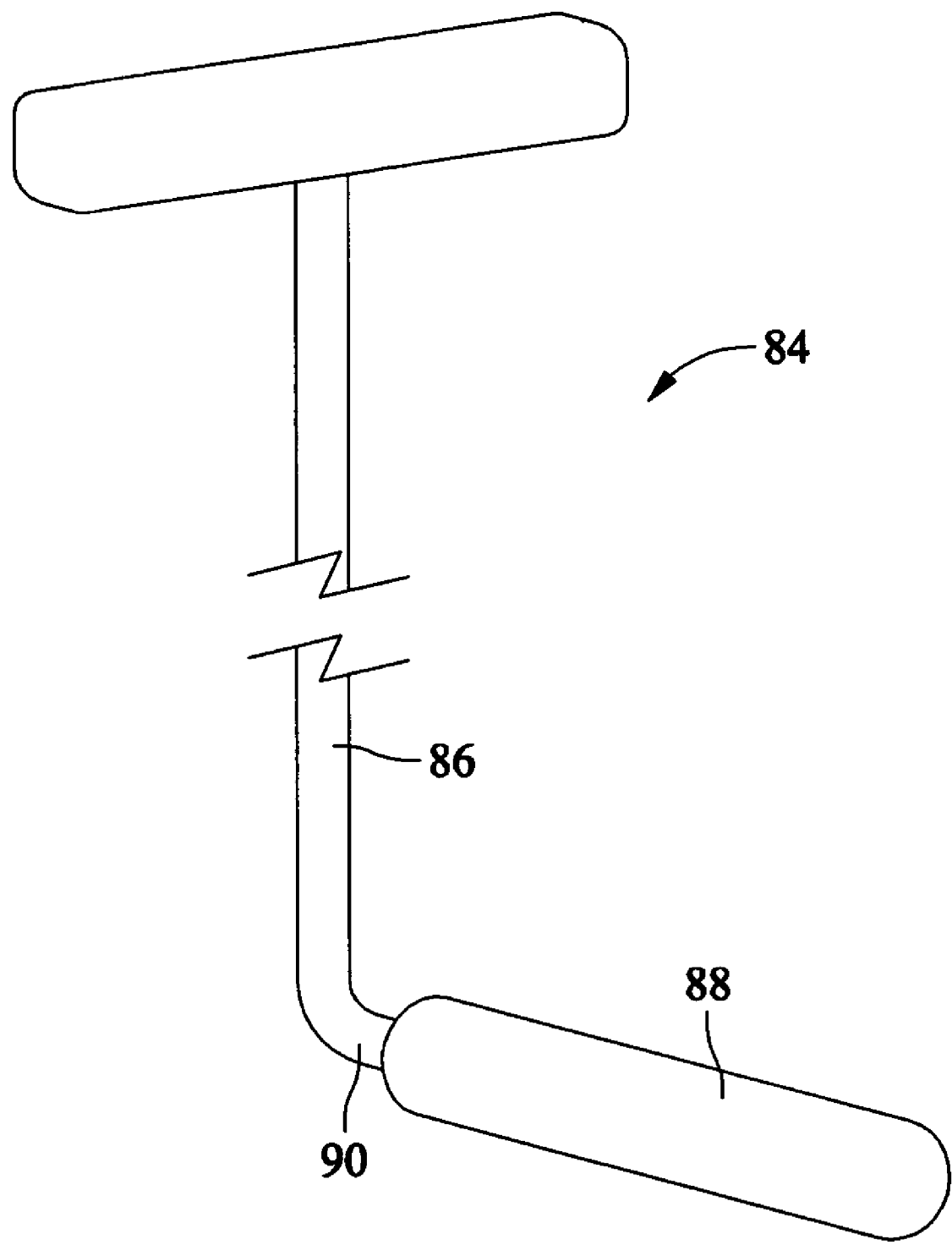
FIG. 16 is a perspective view of the removal tool for the slip fit quick disconnect pipe coupler.
Figure 17:
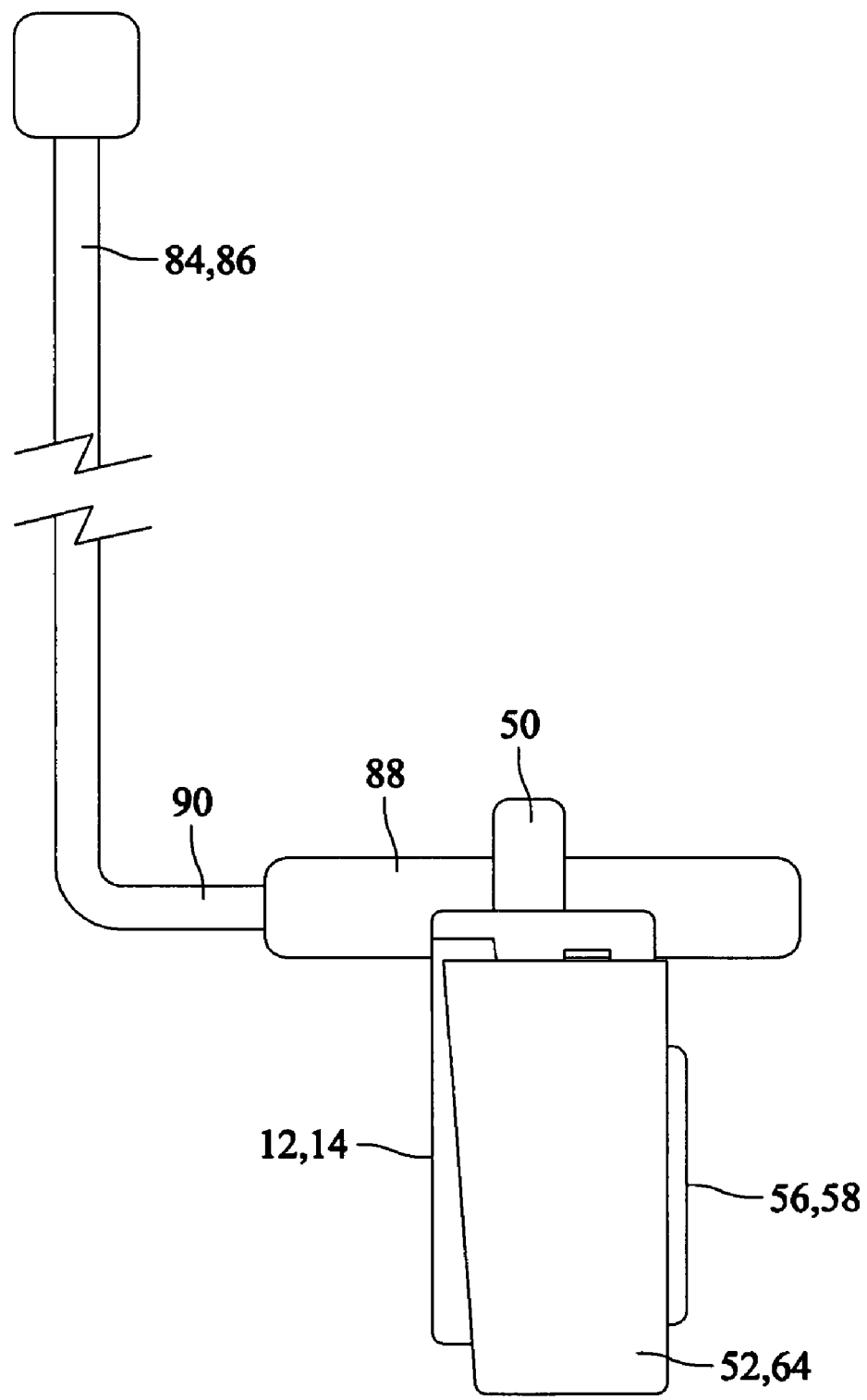
FIG. 17 is a left plan view of the removal tool engaged with an assembled slip fit quick disconnect pipe coupler.
Figure 18:
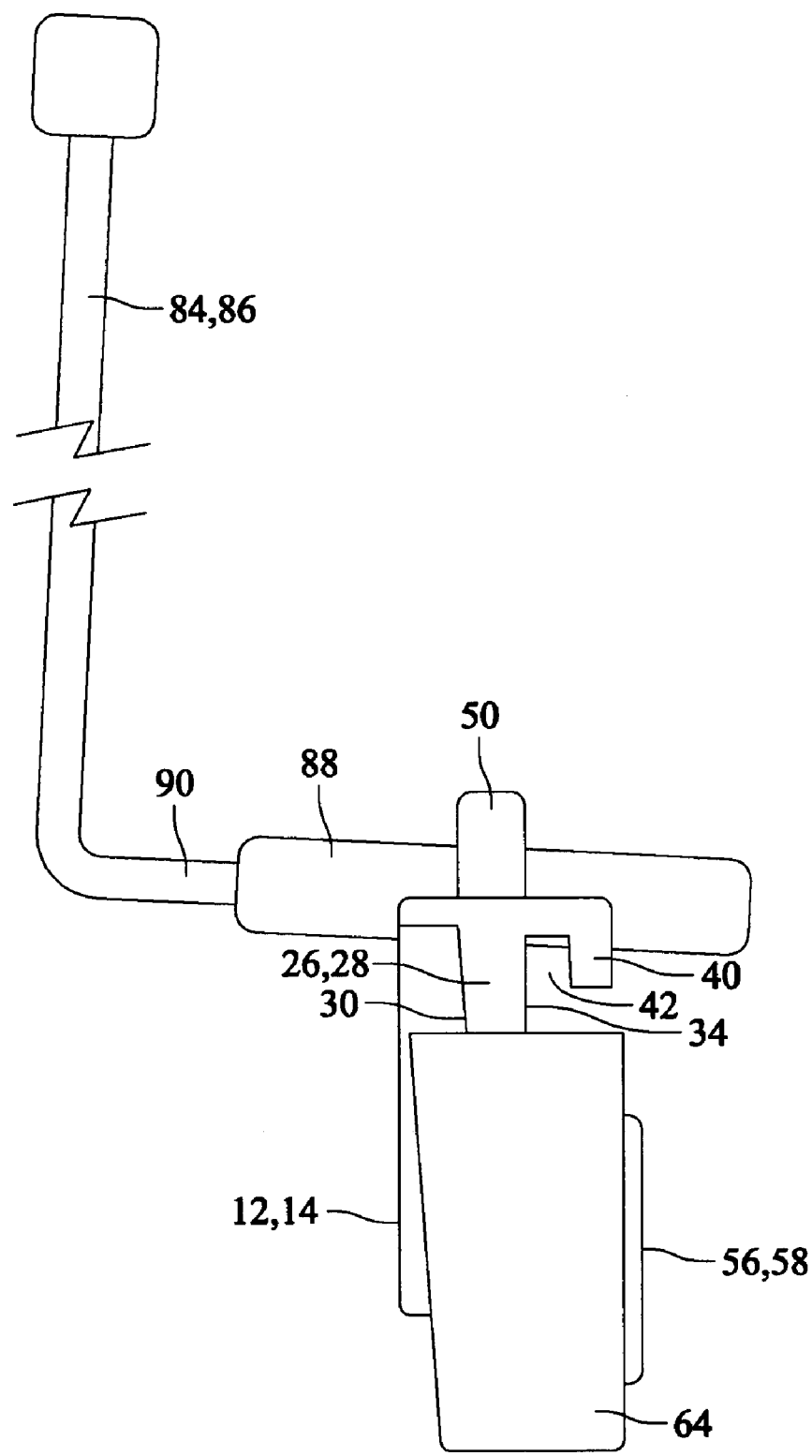
FIG. 18 is a left plan view of the removal tool engaged and slightly canted showing the separation method between the insertion and housing portion.
Figure 19:
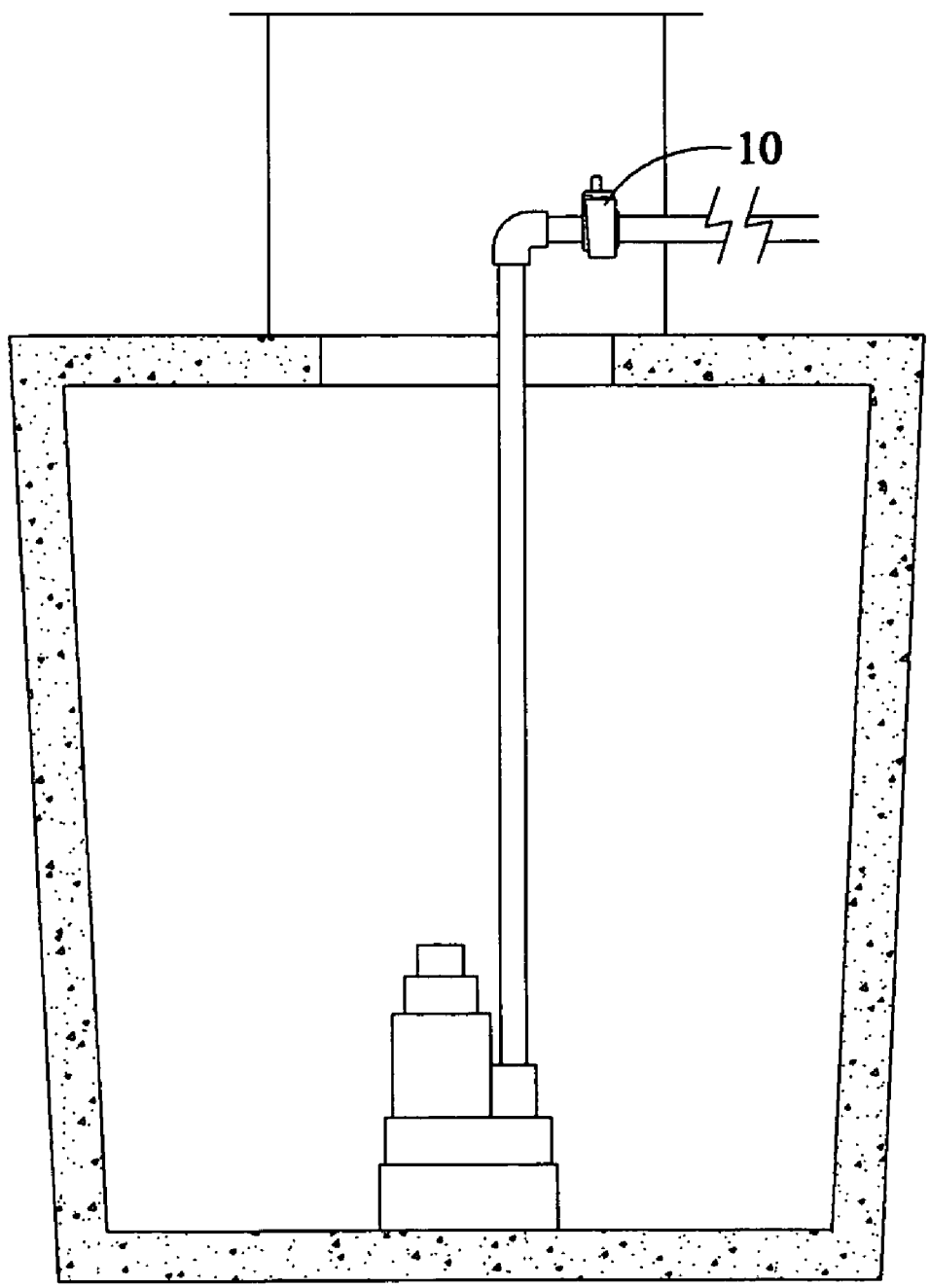
FIG. 19 is a cross sectional view of the slip fit quick disconnect pipe coupler installed within a septic system.
Figure 20:
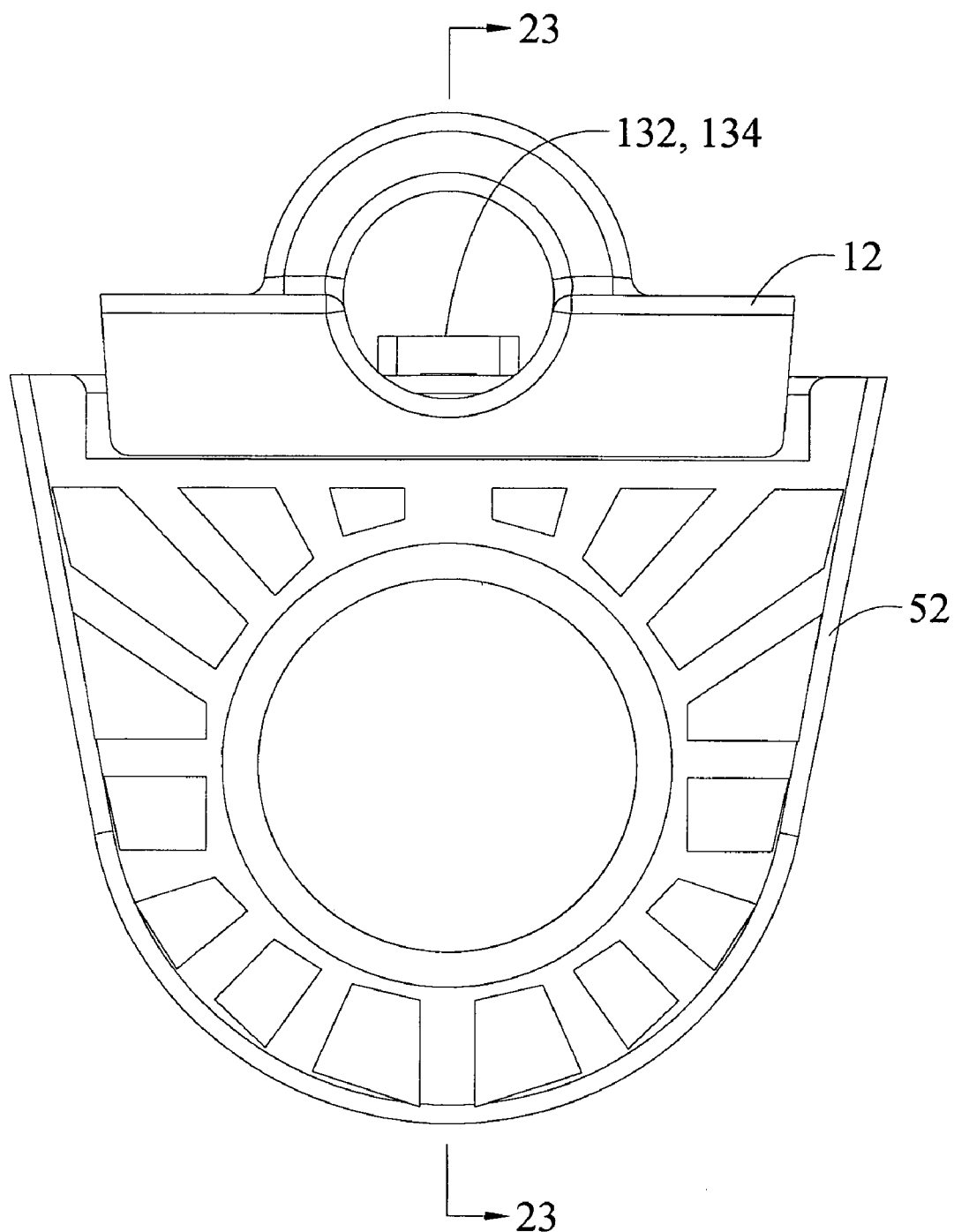
FIG. 20 is a front plan view of an alternative embodiment of the slip fit quick disconnect pipe coupler in an assembled form showing the latch assembly.
Figure 21:
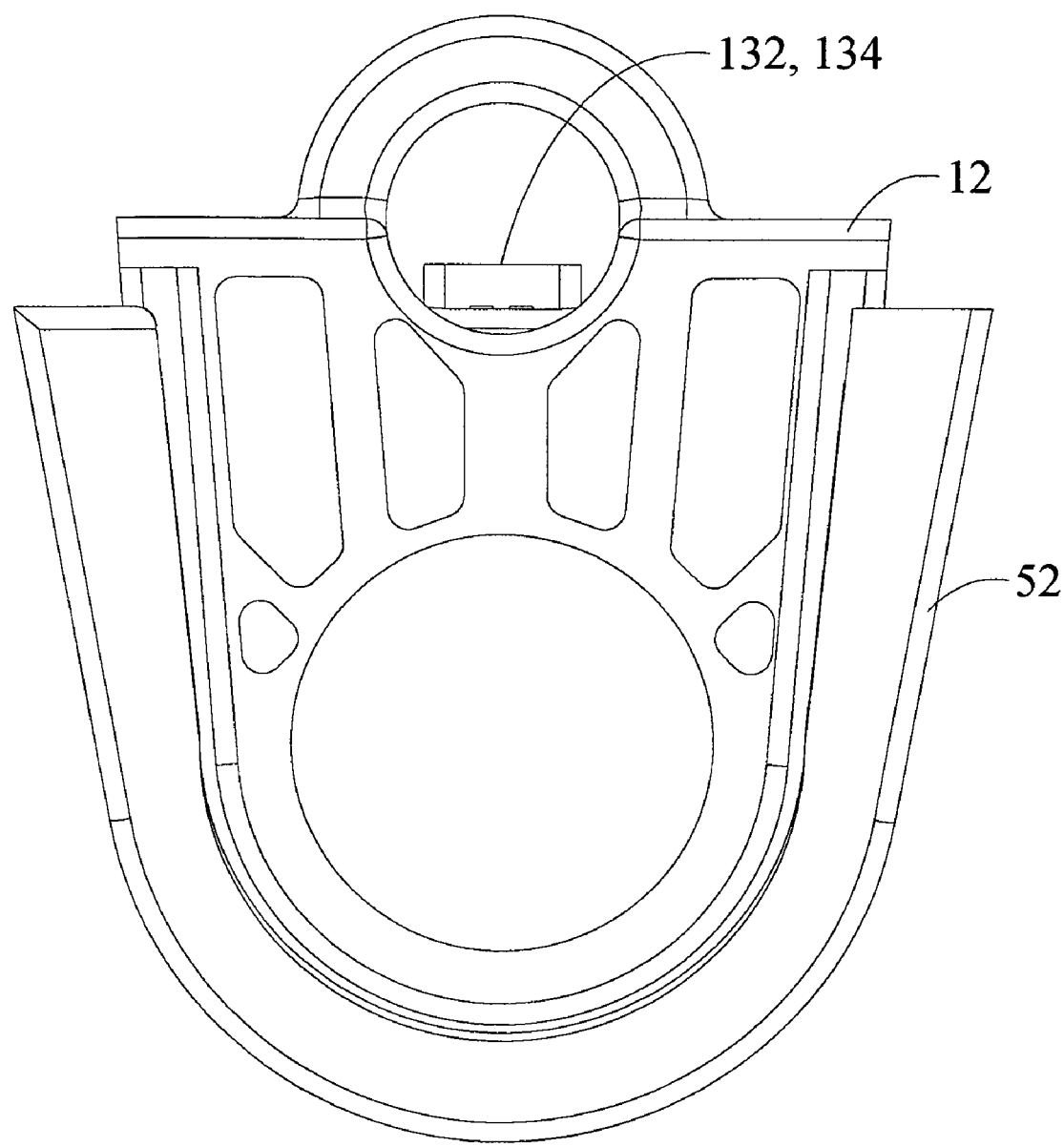
FIG. 21 is a rear plan view of said alternative embodiment of the slip fit quick disconnect pipe coupler in an assembled form showing the latch assembly.
Figure 22:
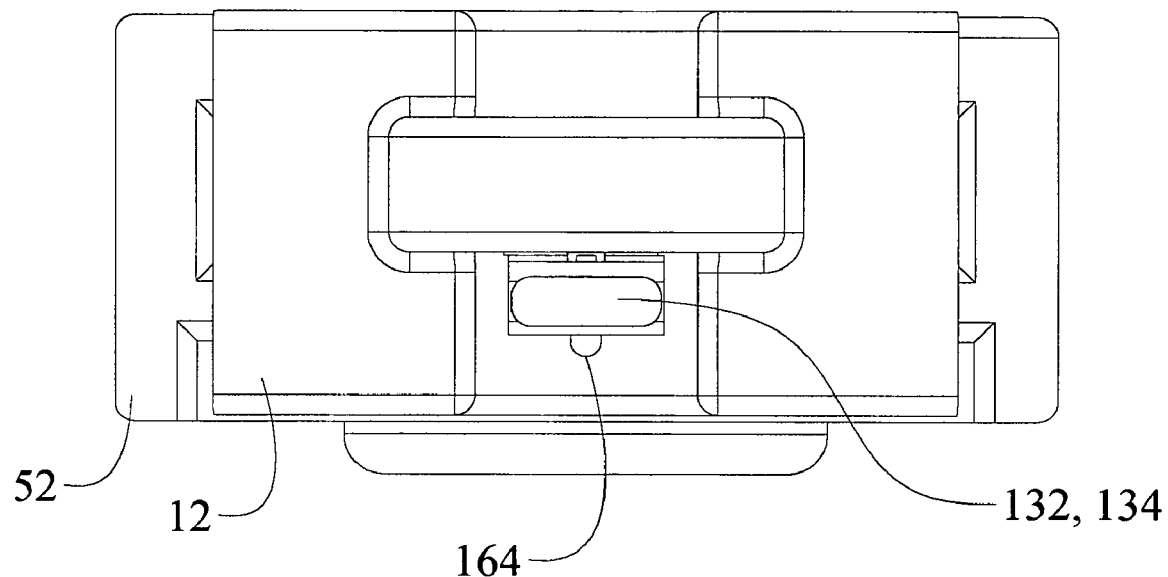
FIG. 22 is a top plan view of said alternative embodiment of the slip fit quick disconnect pipe coupler in an assembled form showing the latch assembly.
Figure 23:
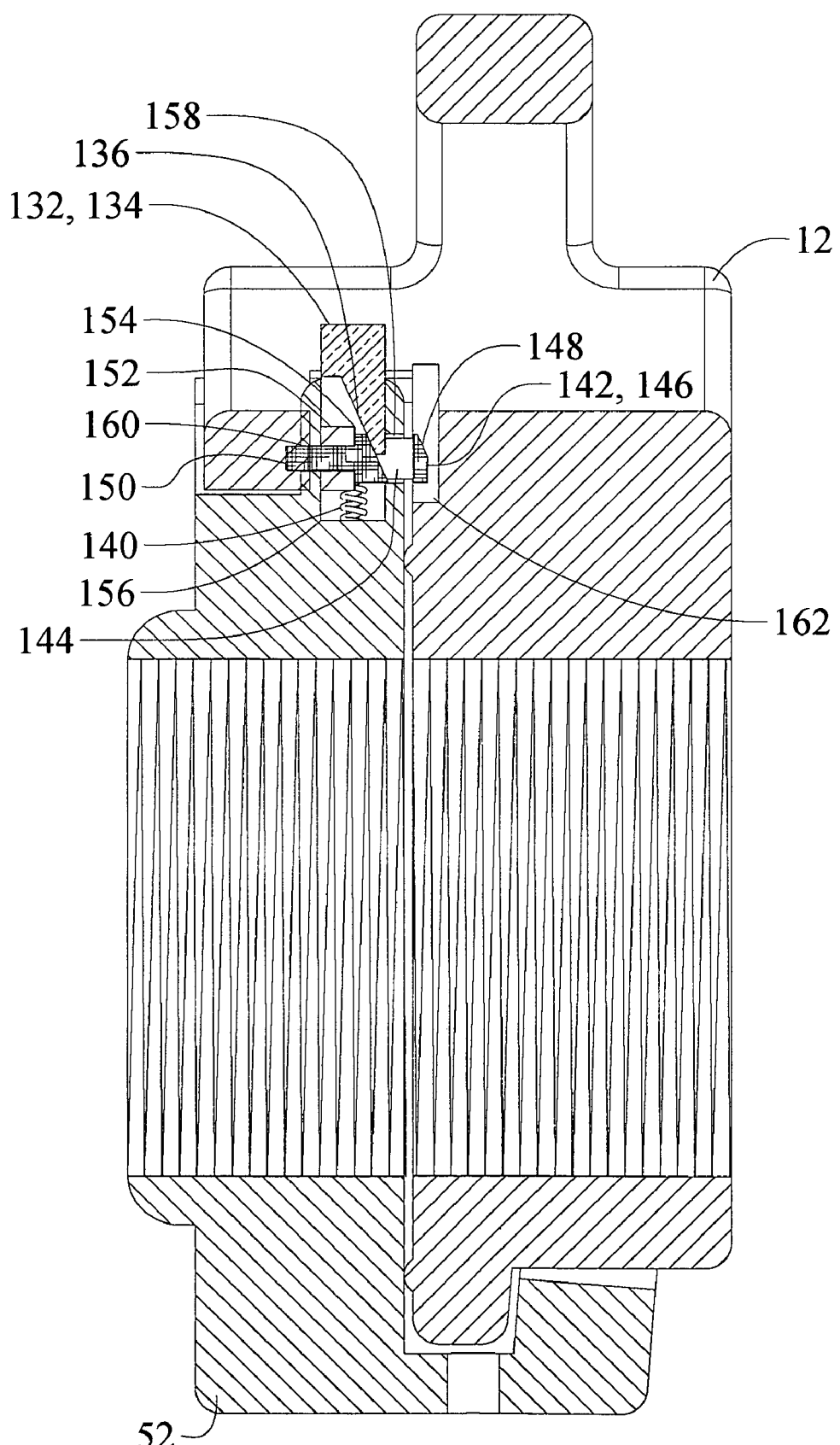
FIG. 23 is a cross sectional view taken along line 23-23 of FIG. 20.
Figure 24:
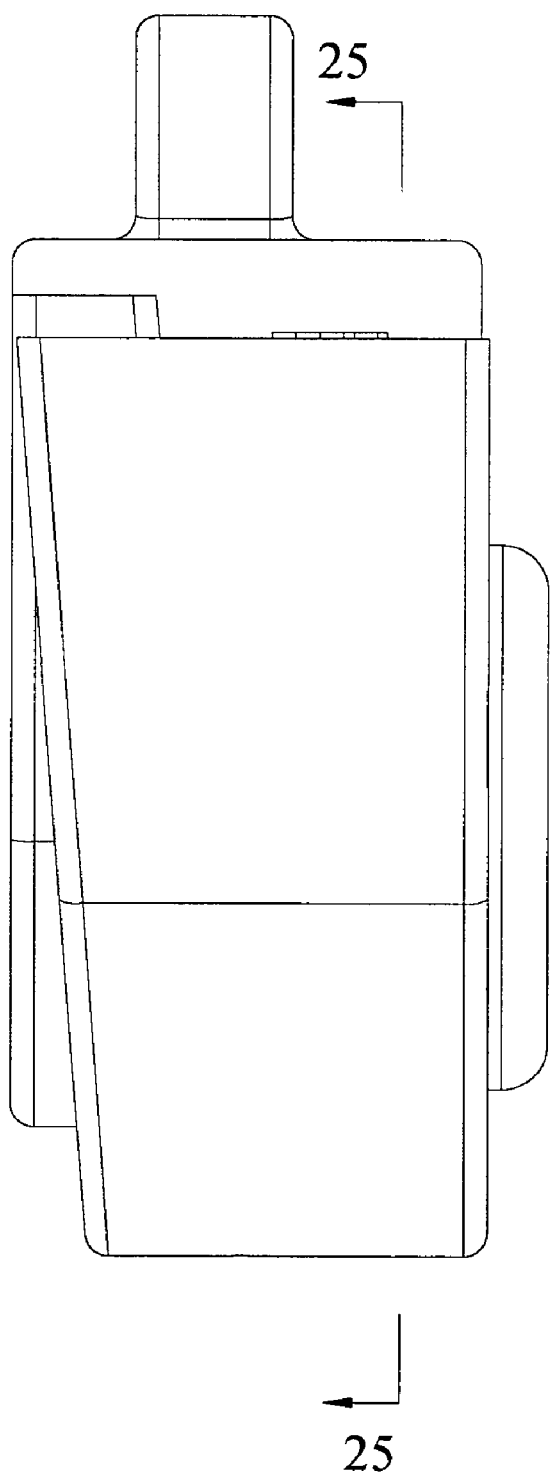
FIG. 24 is a left plan view of said alternative embodiment of the slip fit quick disconnect pipe coupler in an assembled form with said latch assembly.
Figure 25:
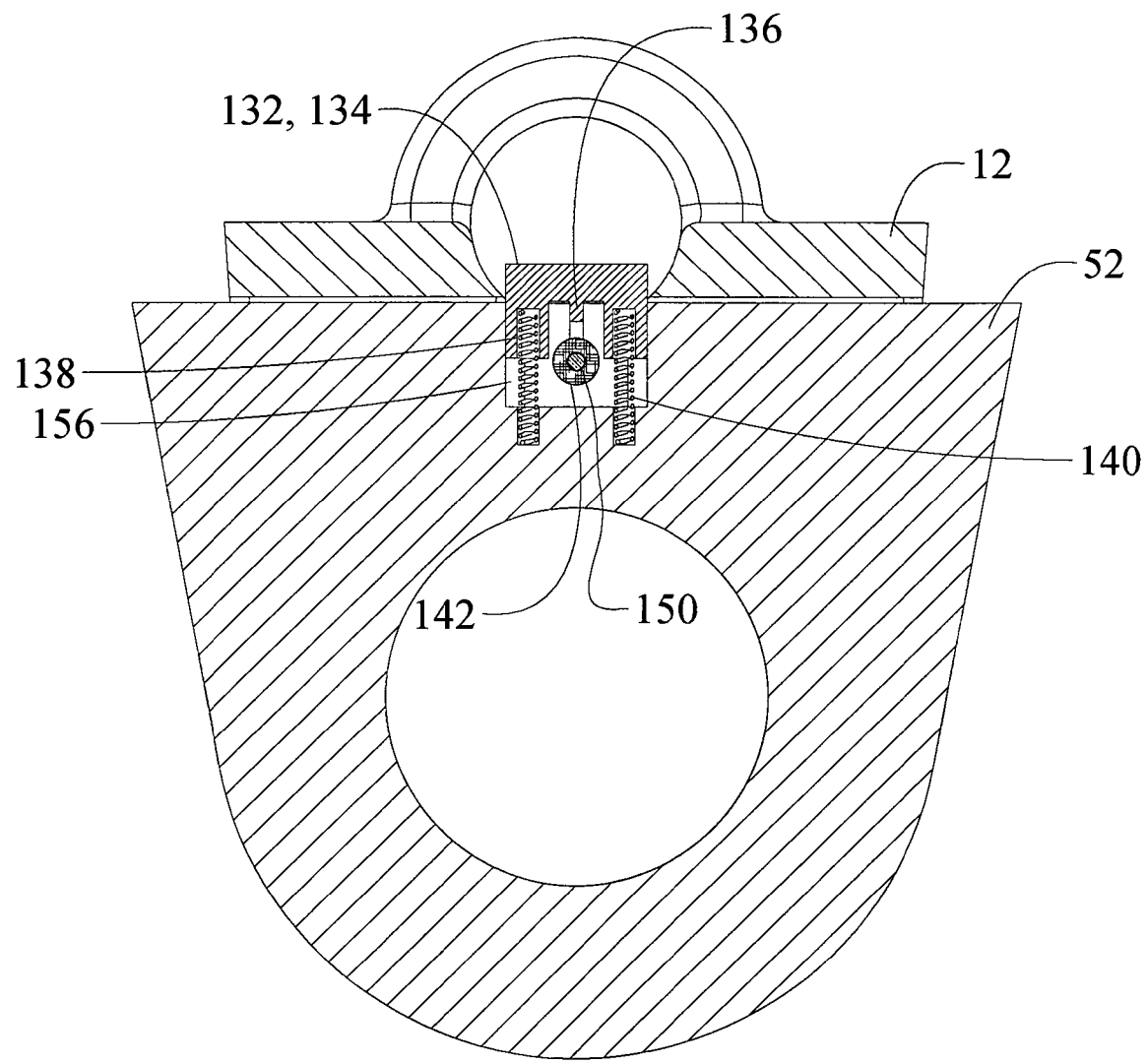
FIG. 25 is a cross sectional view taken along line 25-25 of FIG. 24.
Figure 26:
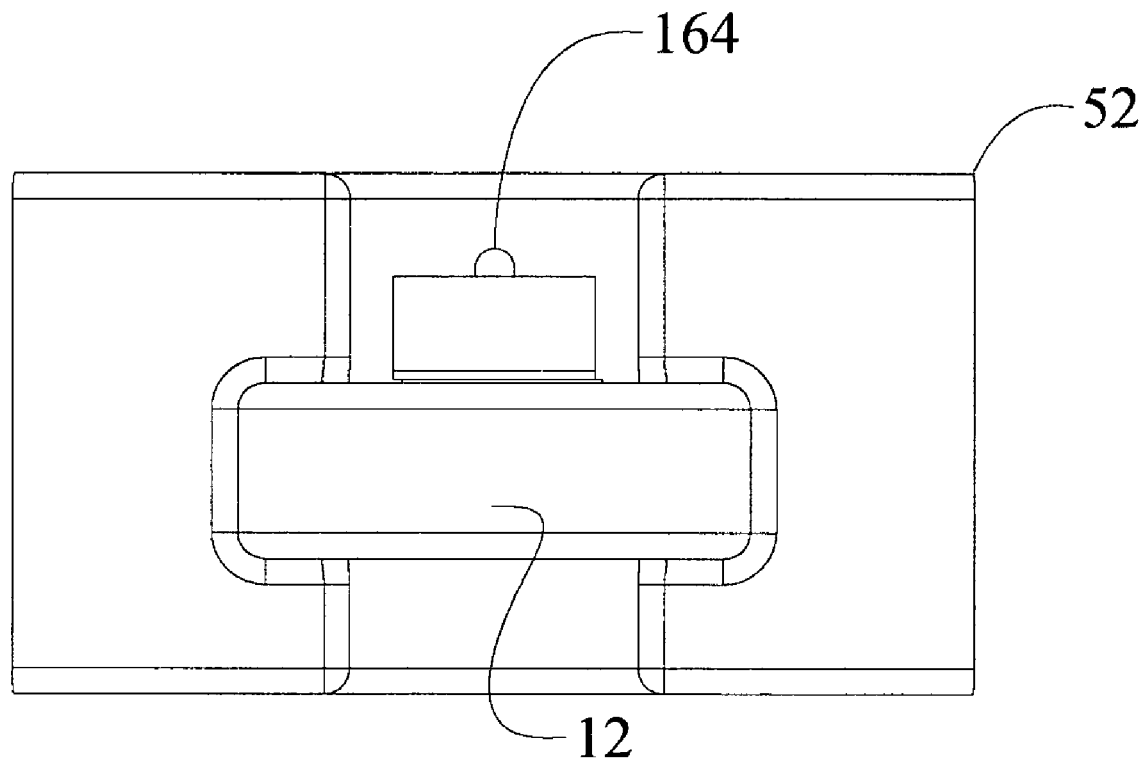
FIG. 26 is a top plan view of said alternative embodiment of the slip fit quick disconnect pipe coupler in an assembled form with said latch assembly.
Figure 27:
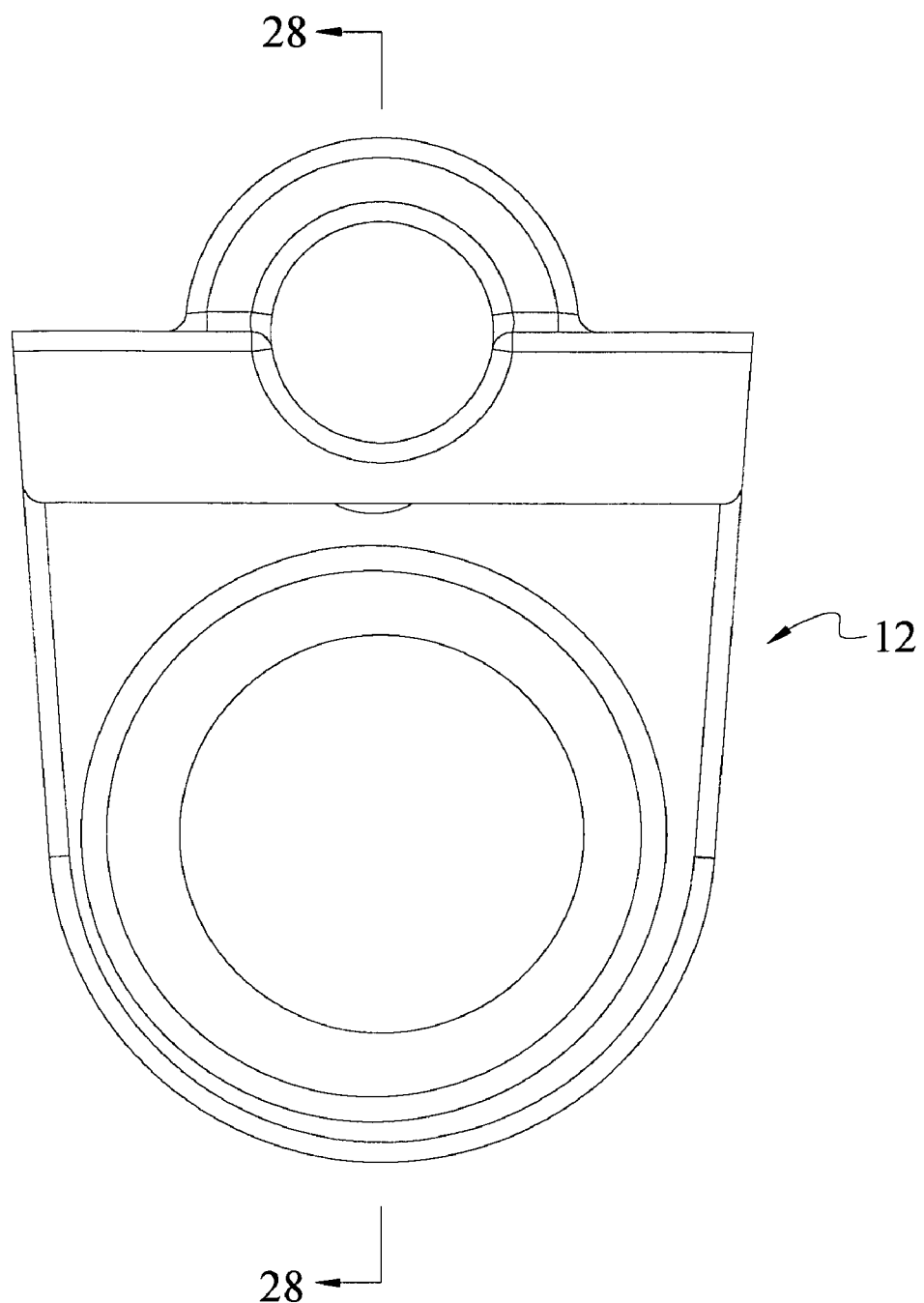
FIG. 27 is a front plan view of the insertion portion of said alternative embodiment of the slip fit quick disconnect pipe coupler with said latch assembly.
Figure 28:
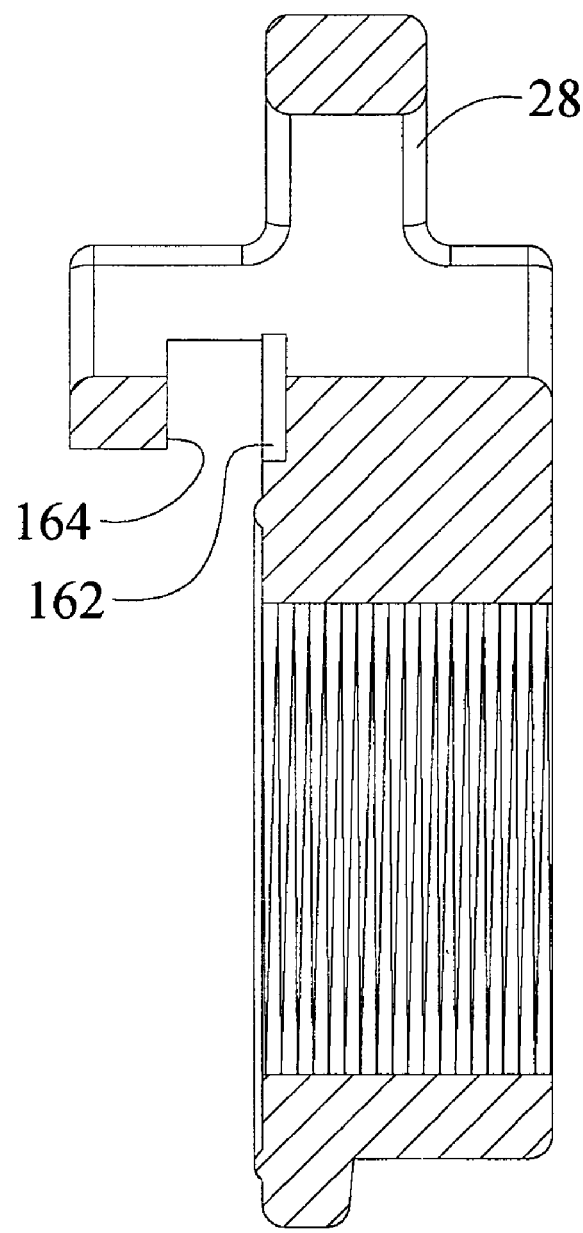
FIG. 28 is a cross sectional view taken along line 28-28 of FIG. 27.
Figure 29:
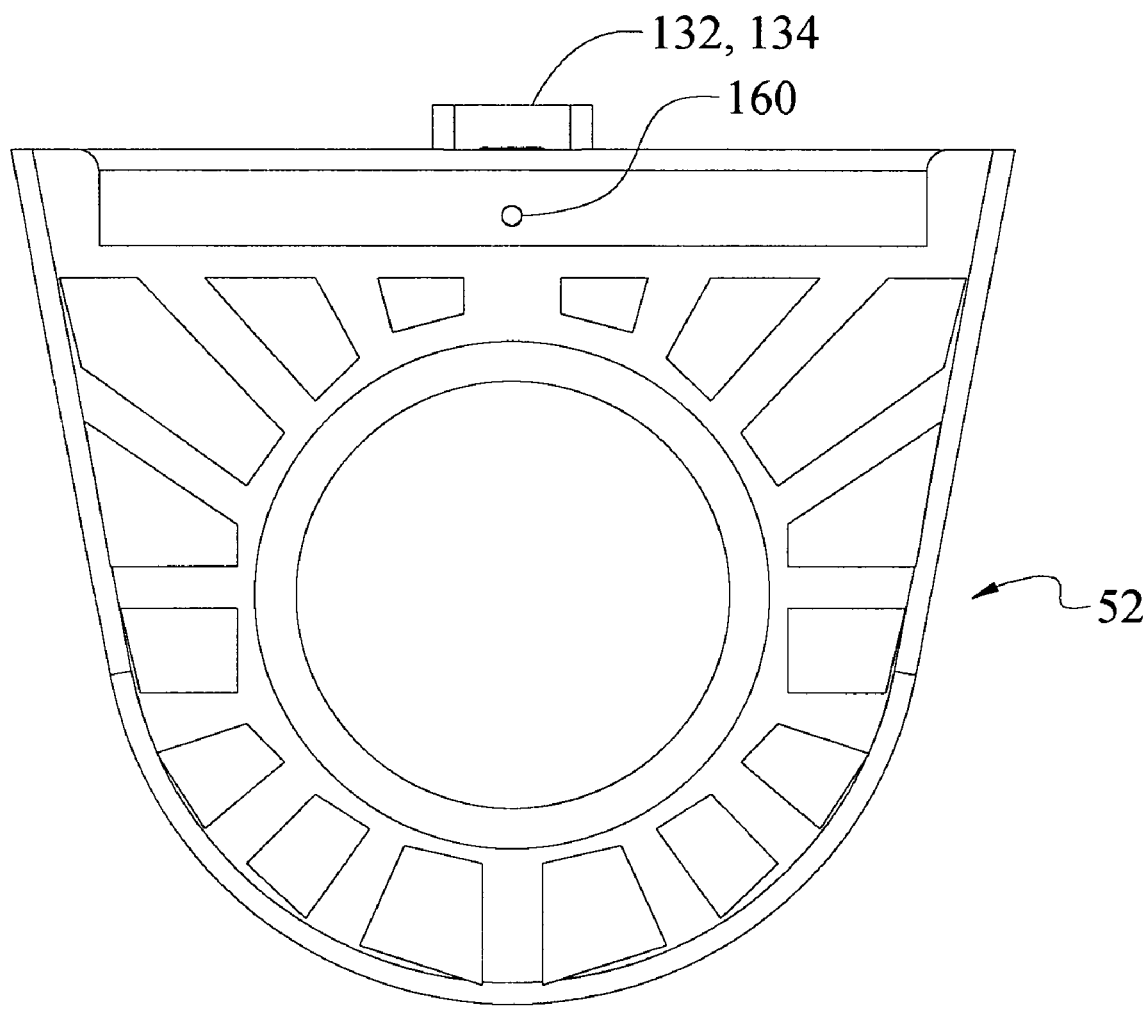
FIG. 29 is a front plan view of the housing portion of said alternative embodiment of the slip fit quick disconnect pipe coupler with said latch assembly.
Figure 30:
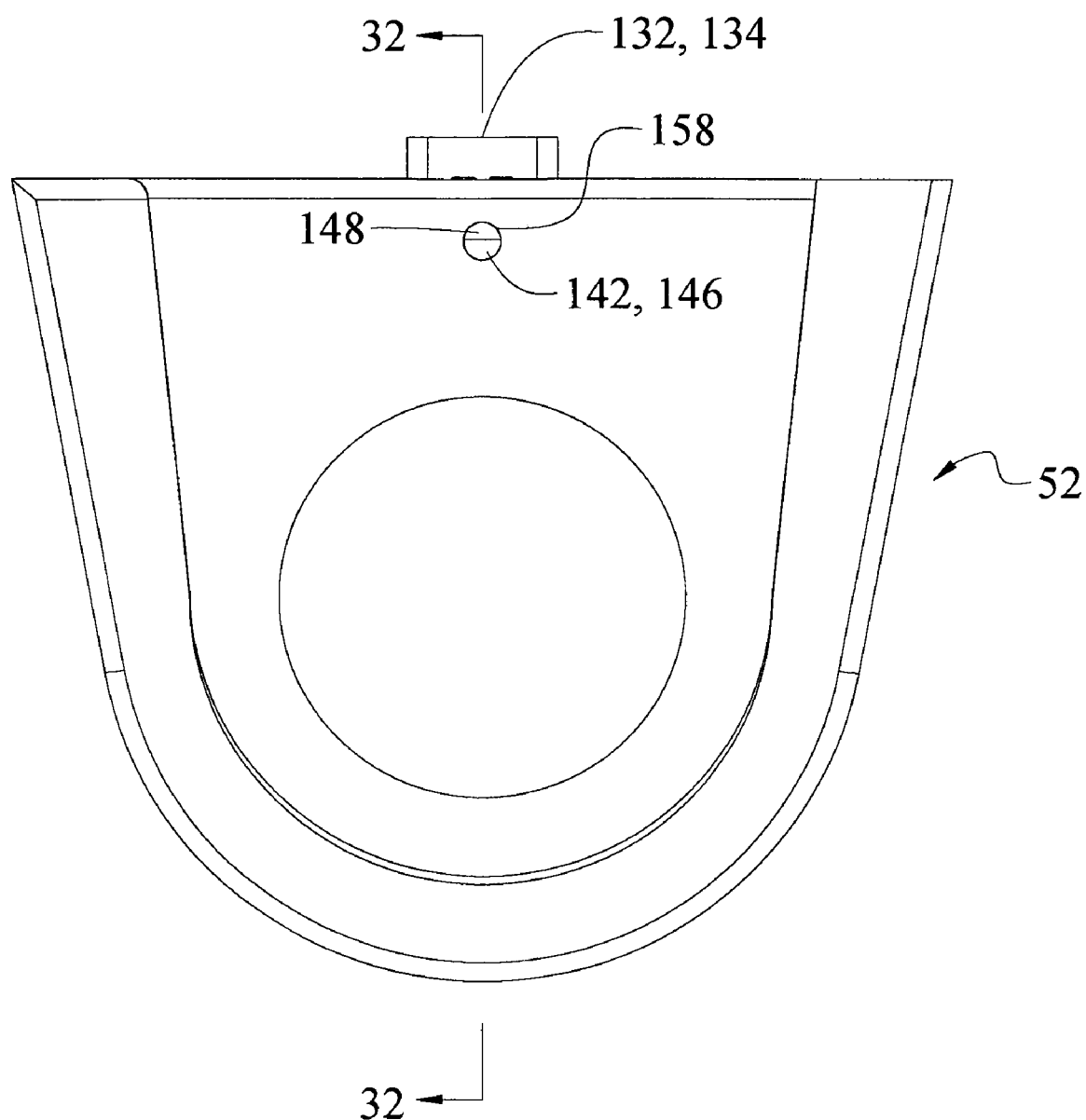
FIG. 30 is a rear plan view of the housing portion of said alternative embodiment of the slip fit quick disconnect pipe coupler with said latch assembly.
Figure 31:
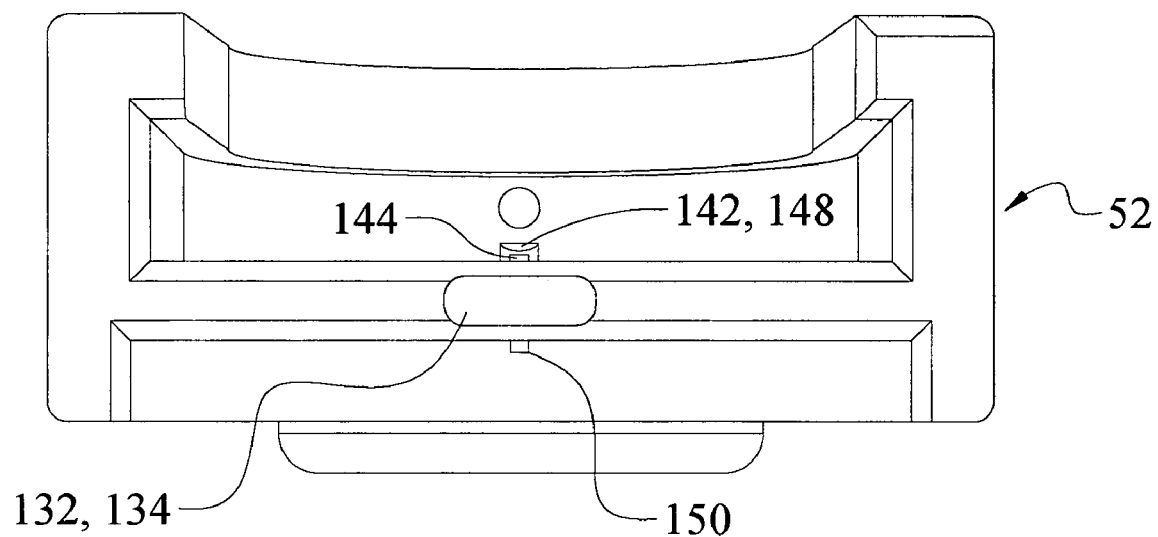
FIG. 31 is a top plan view of the housing portion of said alternative embodiment of the slip fit quick disconnect pipe coupler with said latch assembly.
Figure 32:
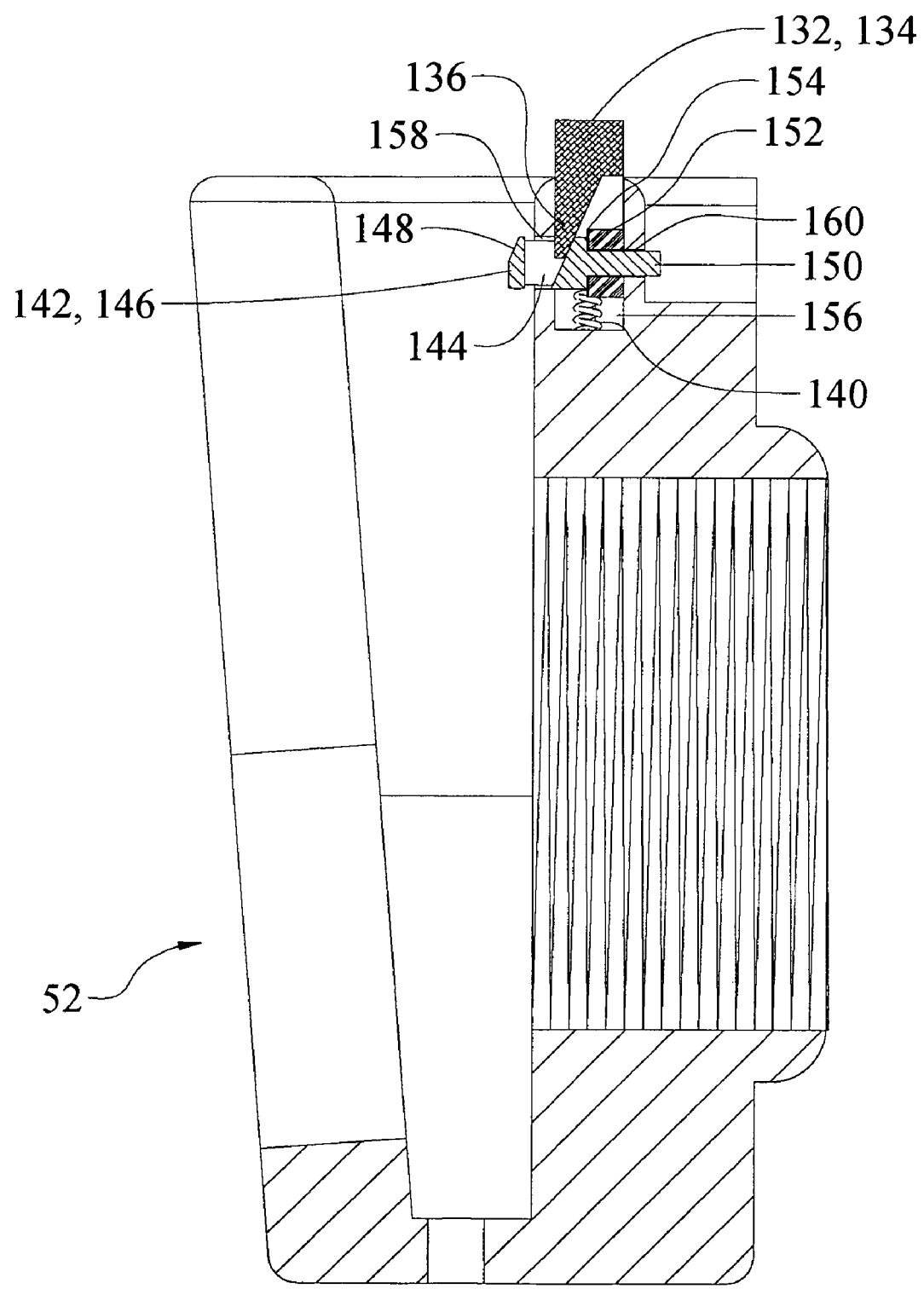
FIG. 32 is a cross sectional view taken along line 32-32 of FIG. 30.
Figure 33:
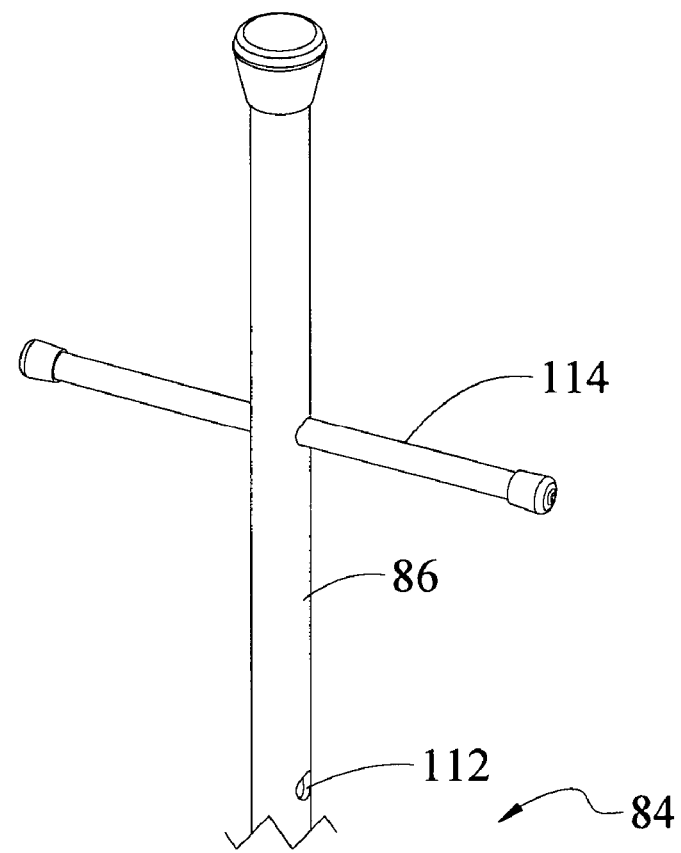
FIG. 33 is a perspective view of the alternative embodiment removal or decoupling tool.
Figure 33:
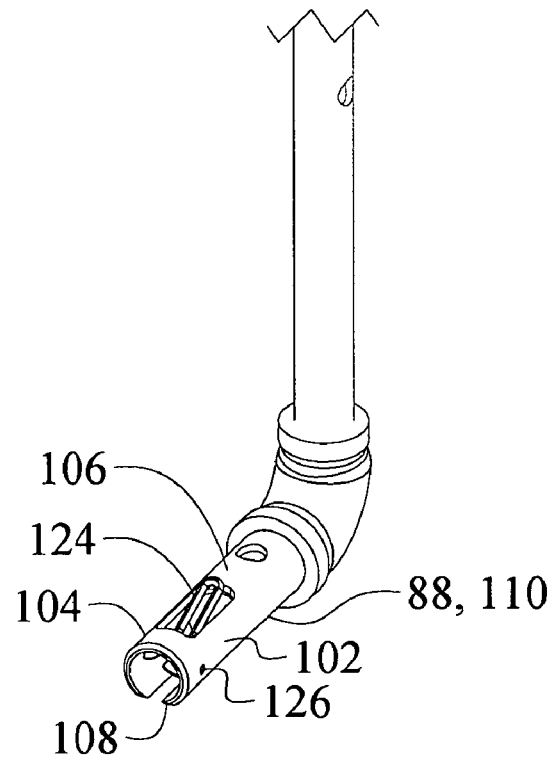
Figure 34:
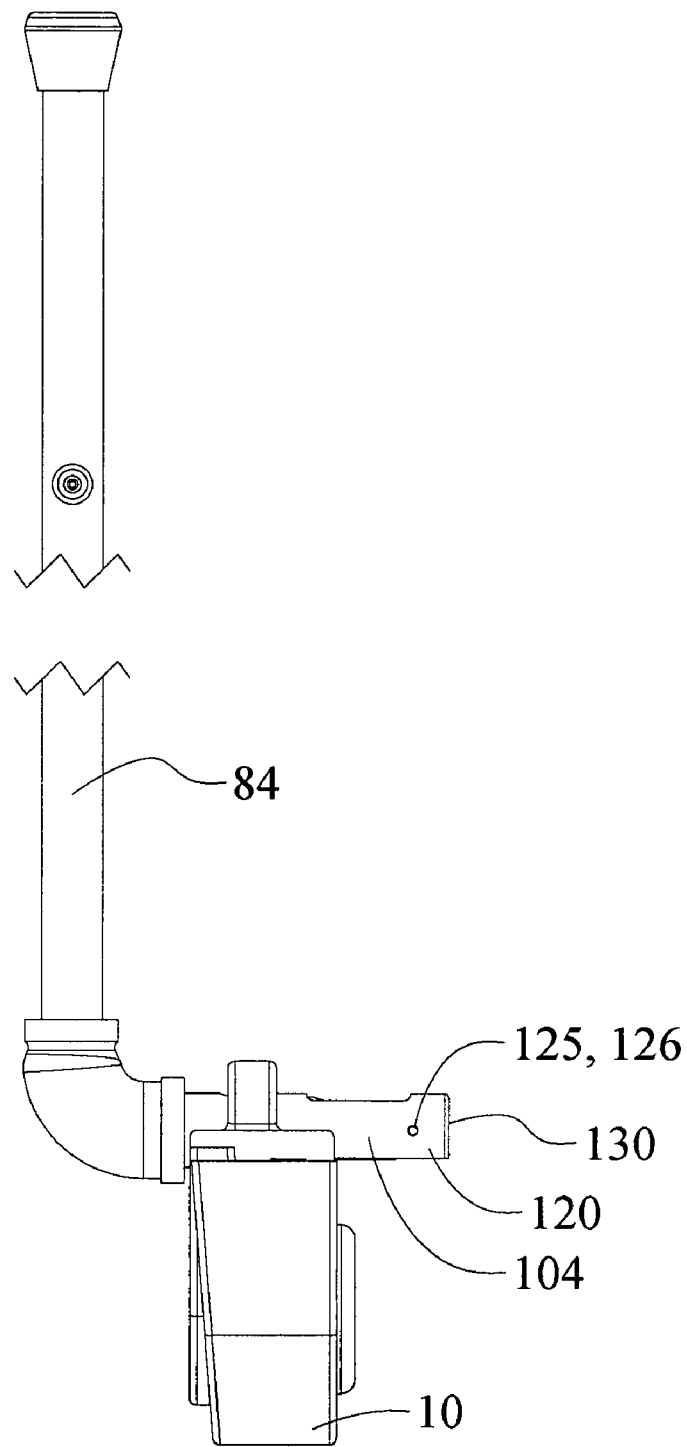
FIG. 34 left plan view of said alternative embodiment removal tool engaged with an assembled slip fit quick disconnect pipe coupler.
Figure 35:
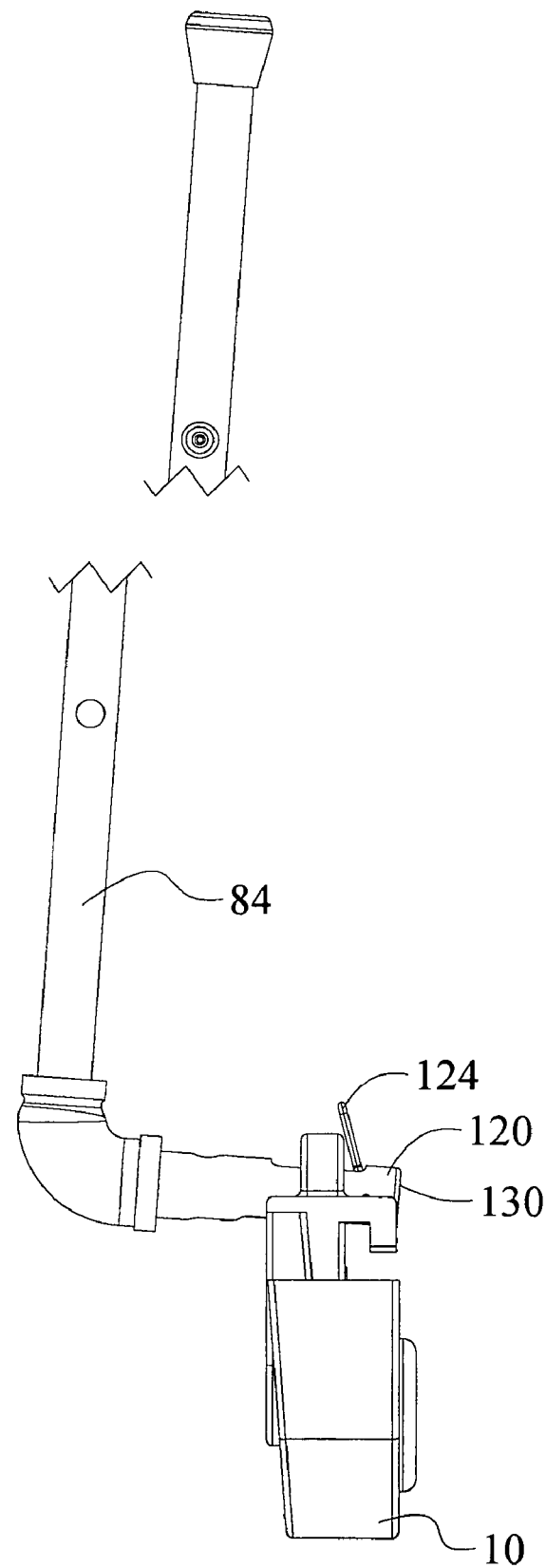
FIG. 35 is a left plan view of said alternative embodiment removal tool engaged and slightly canted showing the separation method between the insertion and housing portion.
Figure 36:
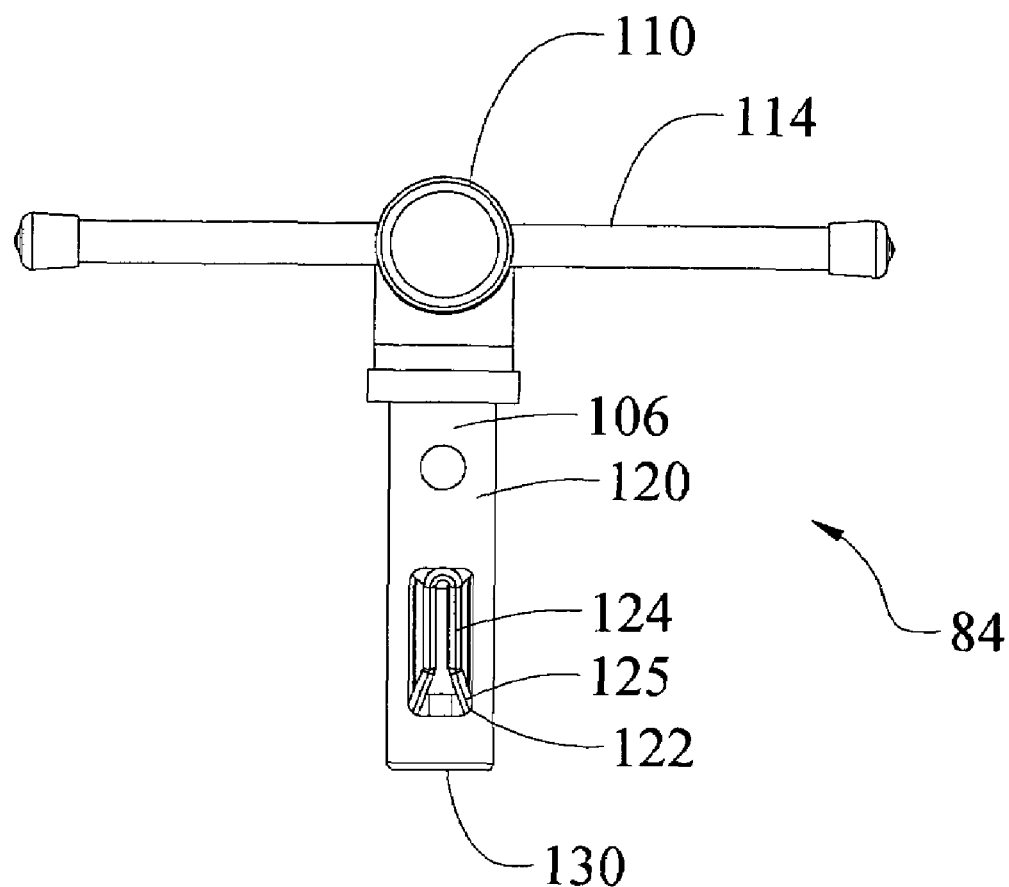
FIG. 36 is a top plan view of said alternative embodiment removal tool.
Figure 37:
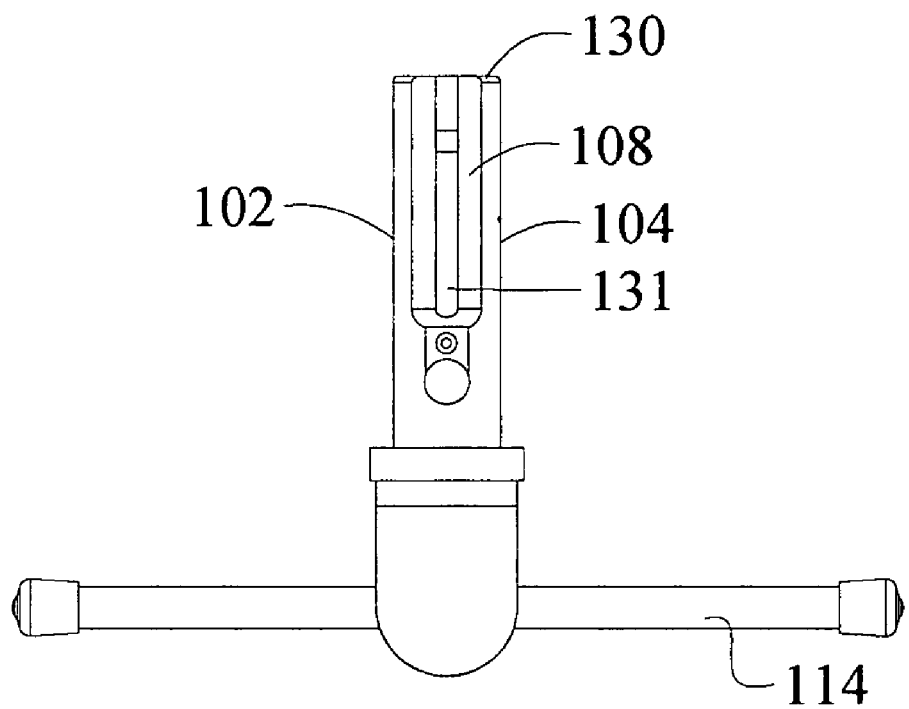
FIG. 37 is a bottom plan view of said alternative embodiment removal tool.
Figure 38:
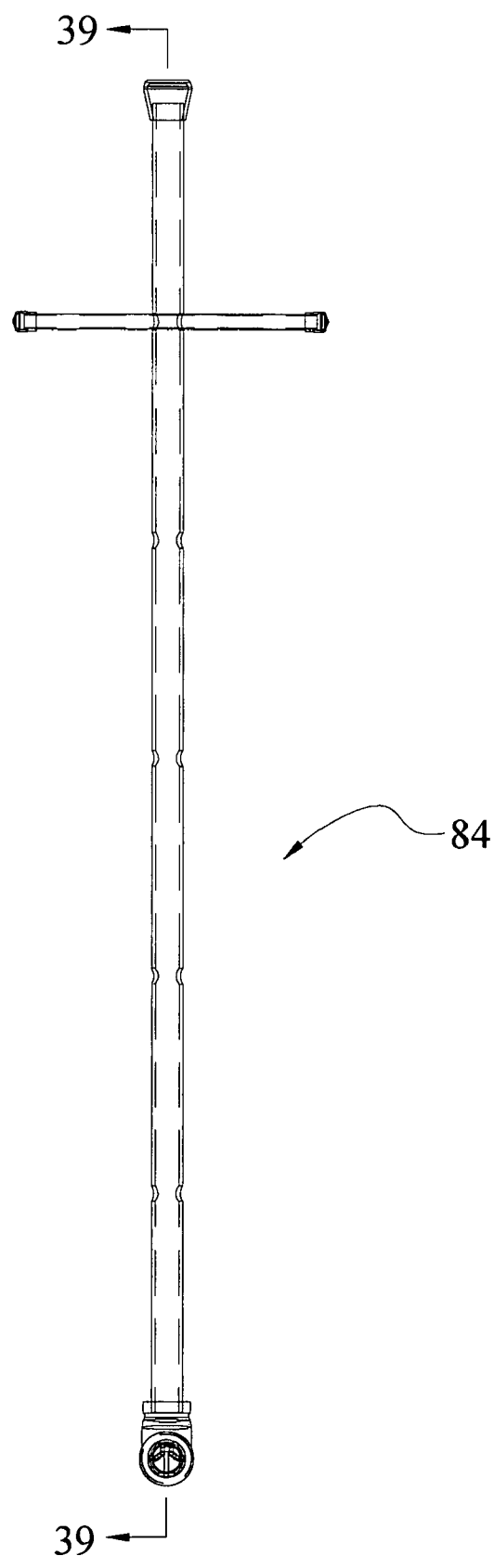
FIG. 38 is a front plan view of said alternative embodiment removal tool showing the strap member retainer retracted.
Figure 39:
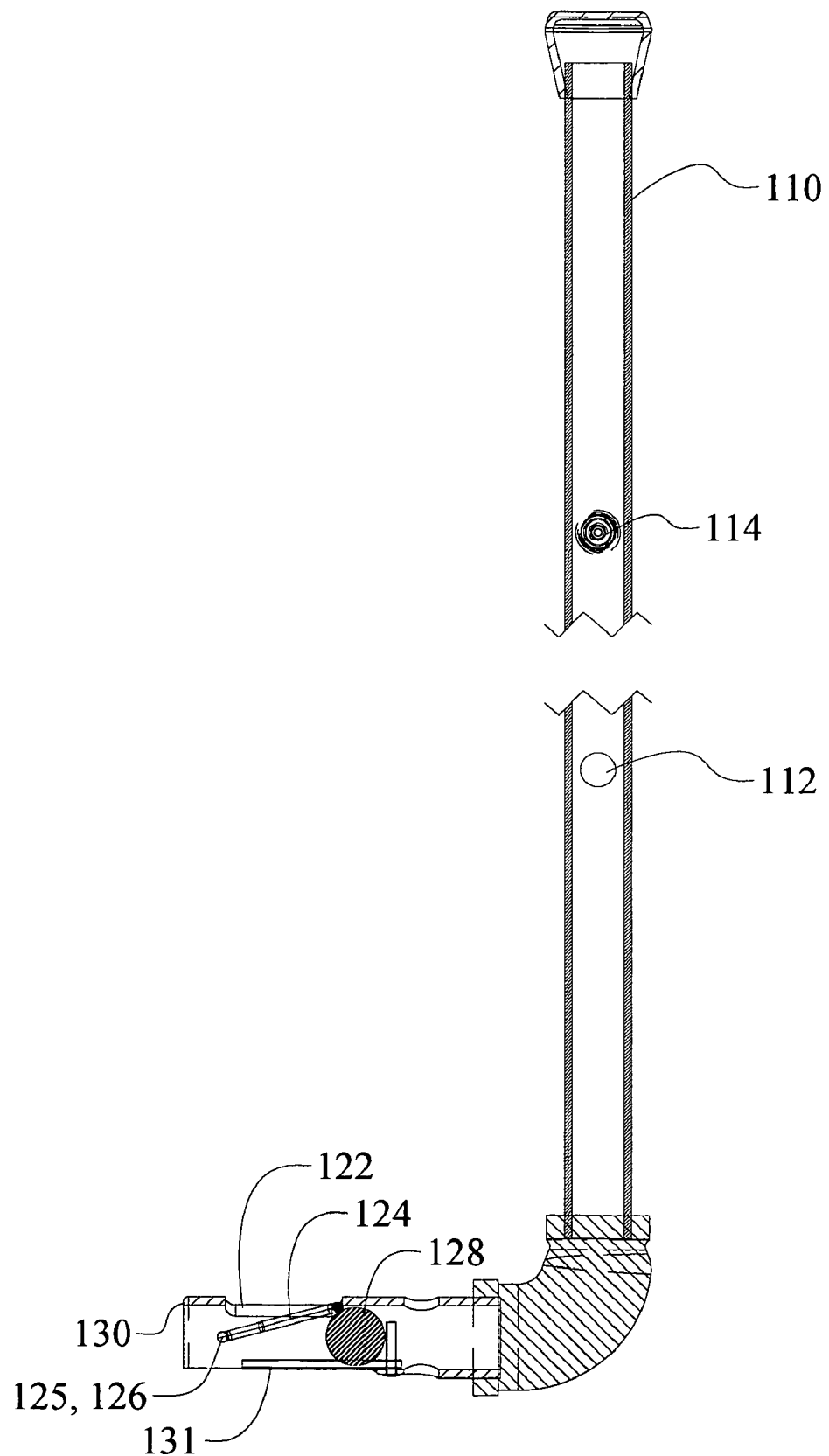
FIG. 39 is a cross sectional view taken along line 39-39 of FIG. 38.
Figure 40:
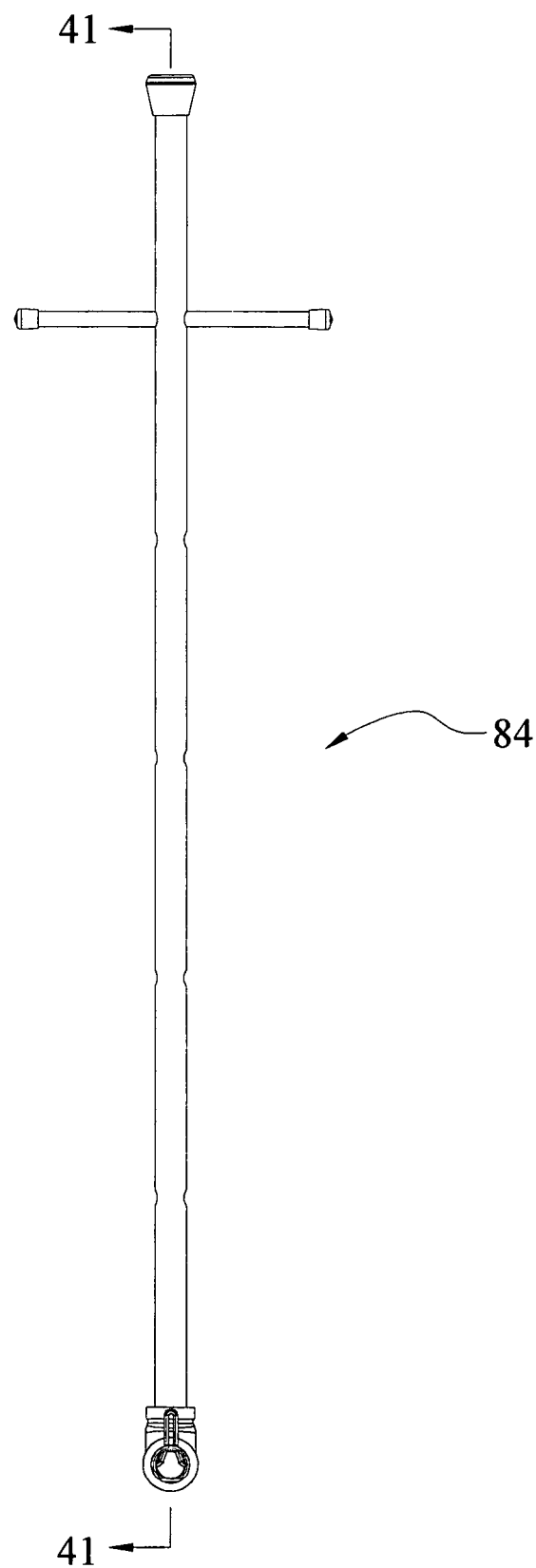
FIG. 40 is a front plan view of said alternative embodiment removal tool showing the strap member retainer extended.
Figure 41:
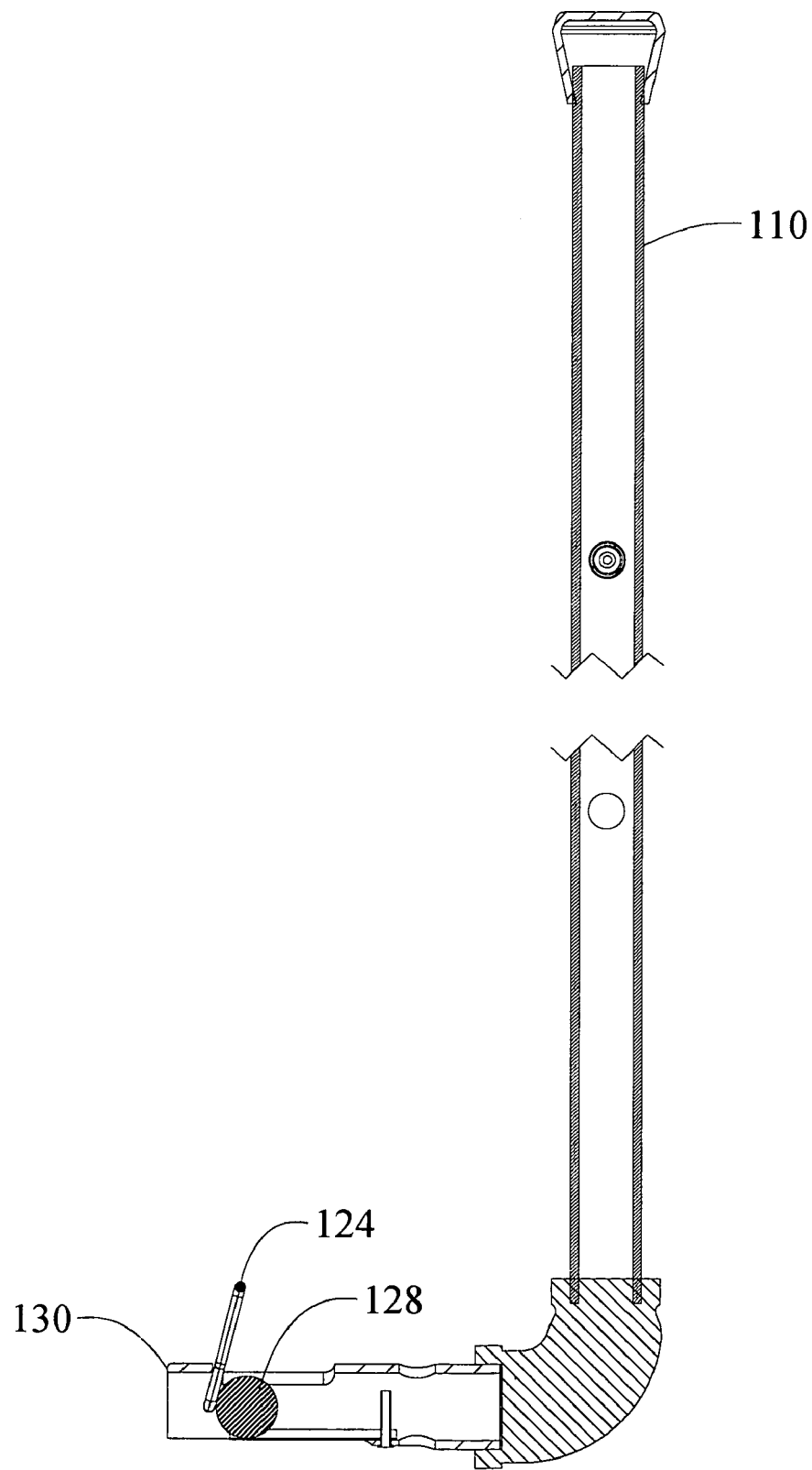
FIG. 41 is a cross sectional view taken along line 41-41 of FIG. 40.

Referring now to the drawings, there is shown in FIGS. 1-41 a preferred embodiment of a slip fit quick disconnect pipe coupler 10 and the removal tool 84. The device 10 is particularly adapted for quick coupling and repeated disconnection of any types of pipes, especially within septic pump tanks, wells, cisterns, sumps, industrial pits, and other liquid storage facilities including swimming pool equipment. Said pipes may be of any material including but not limited to metallic and polyvinyl chloride (PVC).

The present invention 10 comprises a first insertion portion 12 which slidably fits within a housing portion 52 in order to couple two pipes having pressurized contents in a sealed manner. Unlike prior art devices, the present art 10 easily couples and separates yet provides an assured seal between two or more pressurized pipes in a form which may be economically manufactured.

The housing portion 52 comprises a front side 56, a rear side 72, a right side 66, and a left side 64, a top side 76 and a bottom side 68, said front side 56 having a second pipe coupling portion 58 to secure and seal a pipe. (Said second pipe coupling portion 58 is referenced relative to a first pipe coupling portion on 16 on said insertion portion 12.) Preferably said second pipe coupling portion 58 is a female threaded 60 conventional tapered pipe thread but in alternative embodiments said coupling portion 58 may comprise male pipe threads or secure said pipe by other means such as adhesives, solders, or welds in a male or female relation. Alternative embodiments may also utilize non-tapered threads.

Unique to the present coupler 10 is a topside indent 62 visible on said front side 56 and said top side 76 which interlocks with an overhanging lip 40 on said insertion portion 12 when assembled. Integral to this indent 62 is a bridge 80 which completes the interlocking mechanical structure and is visible from the front side 56, top side 76, and rear side 72. Said bridge 80 may be formed and function without said indent 62 in alternative embodiments. This interlocking provides a coupling strength not heretofore found on prior art slip fit couplings. That is, without this interlocking feature, the prior art slip fit pipe couplers, by necessity, must be manufactured from cast bronze or other non-corrosive metallic materials in order to provide the sealing strength necessary to work with pressurized pipes. The present art overhanging lip 40 engaged with said indent 62 allows the coupler 10 to be manufactured inexpensively from a plurality of polymer materials while assuring a pressurized seal.

Said top side 76 has an insertion opening 77 into which a flange 26 of said insertion portion 12 is inserted. Visible from said top side 76 and attached with the rear side 72 is a double tapered channel 78 of substantially equivalent width and breadth as said flange 26. That is, said channel 78 tapers in width (i.e. flange 26 thickness) and breadth (i.e. separation of said channel 78 location from proximately near the left side 64 and right side 66). In a preferred embodiment, said channel 78 is substantially continuous from the top side 76 back to said top side 76, i.e. proximately near said left side 64 to proximately said right side 66, again substantially conforming to said flange 26. Integral to said channel 78 and visible from the top side 76 is a lip 82 on the rearmost side of said channel which completes the geometrical form of the channel 78. Those skilled in the art understand the advantages of a tapered fit between two mechanical components. That is, a tapered fit will assure a binding connection between two bodies yet allow for easy separation once the taper connection is "popped" or broken. Alternative embodiments may utilize a non-tapered or tapered channel 78 which is continuous or disjoint. Further alternative embodiments may utilize a tapered channel 78 with a stepped taper. That is, different portions of the channel 78 may taper at different rates or have only a portion tapered. Still further alternative embodiments may utilize a single tapered channel 78 in either width or breadth.

The rear side 72 of said housing portion 52 has a second face 74 which mates with a first face 34 on said insertion portion 12 when assembled. That is, said second face 74 is of a form to provide a mating with said first face 34 with said gasket 38 there between providing an assured seal. In a preferred embodiment, sealing between said faces 34, 74 is achieved via the tapered channel 78 and flange 26 mating compression of an O-ring or elastomeric gasket 38 mounted within a groove 36 in said first face 34 of said insertion portion 12. In a preferred embodiment, substantially at a channel vertex 63, that is a convergence of the channel 78 at a location substantially opposite said top side 76, is a drainage hole 70 which will show liquid seepage should the seal between said faces 34, 74 fail. Said drainage hole 70 further assures that should the seal fail, hydrostatic pressure will not cause a separation of the slip fit between the two portions 12, 52.

As aforesaid, the insertion portion 12 is designed to mate and create a seal with said housing portion 52. Said insertion portion 12 comprises a front side 32, a rear side 14, a right side 22, a left side 20, a top side 44 and a bottom side 24, said rear side 14 having a first pipe coupling portion 16 to secure and seal a pipe. In a preferred embodiment, as in the housing portion 52, said first pipe coupling portion 16 is a female threaded 18 conventional tapered pipe thread but in alternative embodiments said coupling portion 16 may comprise male pipe threads or secure said pipe by other means such as adhesives, solders, or welds in a male or female relation.

Visible from all sides, 14, 22, 20, 24, 32, except the top side 44, is said flange 26. In a preferred embodiment, said flange 26 has an integral shoulder 30 germane to the mechanical flange 26 structure and a width 28 which decreasingly tapers from proximately near said top side 44 to near said bottom side 24. As viewed from said front side 32, said flange 26 has a tapered breadth 39 toward said bottom side 24 and is continuous from said top side 44 and said left side 20 convergence to said top side 44 and right side 22 convergence and around said bottom side 24. Within the preferred embodiment, said flange 26 and channel 78 each have a substantially equivalently dimensioned radius proximate said bottom side 24, 68 which mate in an interlocking fashion. Alternative embodiments may utilize various forms of said flange 26 and channel 78 proximate said bottom side 24, 68, including but not limited to linear, triangular, stepped, and elliptical forms. Alternative embodiments of said flange 26 may utilize one or more of a subset of the plurality of alternative geometrical forms as described for said channel provided that the flange 26 and channel 78 may mate and create a sealing interface between the faces 34, 74.

The aforesaid overhanging lip 40 of said insertion portion 12 contains a recess 42 into which said bridge 80 of said housing portion 52 fits and mates. That is, said lip 40 mates or presses with said bridge 80 to provide an assured hold. Again, said overhanging lip 40 assures a strength of connection between the two portions 12, 52. Without said overhanging lip 40, hydrostatic pressure within the pipes would substantially require manufacturing the coupler 10 from traditional cast bronze or other metallic materials in order to assure the sealing strength. Again, as aforesaid, said lip 40 allows manufacture from polymer materials such as the NORYL® material.

Unique to the present art coupler 10 is the top side 44 depression 46, opening 48, and strap member 50, in combination forming an orifice 51 between said strap member 50 and said depression 46. Although described as an orifice 51, said orifice 51 may take may shapes and forms including but not limited to a partial or fully round or rectangular opening or combinations thereof. As described within the prior art, separation of a slip fit coupler when utilized within a sump, septic, well, or tank application often requires contorted efforts or the use of specialized tools. The aforesaid combination 46, 48, 50, 51 allows for convenient and quick separation, along with supply pipe and pump removal, via a simple removal or decoupling tool 84 having a shaft 86 and an L-shaped extension 88 which inserts into said orifice 51. A narrow diameter portion 90 between or on said L-shaped extension 88 and said shaft 86 assures a secure hooking or mating with said strap member 50 during removal of said insertion portion 12, supply pipe, and pump. That is, the insertion portion 12 with its attached portions will not fall off of the removal tool 84 during removal.

In a preferred embodiment, the depression 46 in conjunction with the geometric form of said strap member 50 forms said orifice 51. Within said depression 46, the opening 48 communicates and is connected with or within the aforesaid recess 42. Said opening 48 allows the bridge 80 of the housing portion 52 to partially extend into said depression 46 and/or orifice 51 for the promotion of separation of each portion 12, 52 with said removal tool 84. That is, for separation and removal said L-shaped extension 88 is inserted into said orifice 51 and slightly canted. This canting initiates a substantially opposite force couple on said strap member 50 relative to said bridge 80 in order to forcible separate said portions 12, 52. As viewed by one of ordinary skill and as found in the preferred embodiment, optimally said L-shaped extension 88 cross sectional height or diameter closely matches the minimal assembled distance between said bridge 80 and said strap member 50 in order to minimize the cant angle required for utilization of the removal tool 84. Alternative embodiments may loosen the aforesaid tolerance and function with the added inconvenience of a greater cant angle required for initial separation of the tapered portions 26, 78. Alternative embodiments may utilize a plurality of orifice 51 cross sectional geometric forms provided said bridge 80 or equivalent extends through said opening 48 or equivalent whereby said removal tool 84 may initiate separation of the portions 12, 52. In the preferred embodiment, said L-shaped extension 88 substantially conforms in cross section with said interfaced orifice 51/bridge 80 form. Alternative embodiments, as with the aforesaid desired tolerance specifications, may deviate from the preferred embodiment provided that the opposite force couple between the two portions 12, 52 is maintained for separation and removal.

An alternative embodiment of said removal tool 84 or slip fitting quick disconnect pipe decoupling tool 84 (hereafter referred to as decoupling tool for the alternative embodiment) is preferably formed of tubular steel and also in a substantially L-shape. Said decoupling tool 84 comprises an inner surface 106, an outer surface 108 preferably of flattened form, and first 102 and second 104 surfaces. Said decoupling tool 84 further comprises a lever end 110 and a decoupling end 120. Said decoupling end 120 inserts into the pipe coupler orifice 51 which allows the operator to apply force against the pipe coupler bridge 80 of said pipe coupler 10, thereby decoupling said pipe coupler 10. Said decoupling end 120 further comprises a strap member retainer 124 and a ball 128. Said ball 128 is of substantial weight and size to allow rolling of said ball 128 within said tubular decoupling end 120. Said decoupling end 120 further comprises a window 122 on said inner surface 106 to allow at least a portion of said strap member retainer 124 smaller than said window 122 to extend beyond said inner surface 106 of said decoupling end 120 or through said window 122. Said decoupling end 120 also comprises pivot points 126 whereby said strap member retainer 124 is pivotally mounted and a ball guard 131 of a thin sheet material within said tubular structure which substantially prohibits said ball 128 from protruding from said substantially flattened outer surface 108.

Said lever end 110 is of sufficient length to allow an operator to apply adequate force for decoupling said pipe coupler 10 and for extraction of said pipe components. Said lever end 110 further comprises eyes or holes 112 capable of accepting one or more handles 114. Said handles 114 aid in applying addition force, or assist the operator in extracting said supply pipe after decoupling.

Operation of said decoupling tool 84 is by means of canting said decoupling tool 84 against a pipe coupler bridge 80, thereby applying force until decoupling takes place. Gravitational force will cause said ball 128 to roll against said strap member retainer 124, forcing said strap member retainer 124 to an extended position. Once said strap member retainer 124 is extended, the pipe coupler strap member 50 is prevented from slipping off said decoupling tool 84, whereby said decoupling tool 84 may be withdrawn, thereby securely extracting said supply pipe.

The removal or decoupling tool 84 may be manufactured from but not limited to tubular or round stock materials and associated fittings. Although preferably manufactured from tubular steel said decoupling tool 84 may be manufactured from a variety of materials, including but not limited to woods, metals, composites, metals and alloys thereof, or ceramics without departing from the scope and spirit herein intended.

Said decoupling tool 84 is substantially L-shaped and comprised of a rigid material, preferable tubular steel. Said decoupling tool 84 further comprises said inner surface 106 corresponding to that surface within the ninety degree angle or top portion of the substantially L-shaped tool, and said outer surface 108 corresponding to that surface within the 270 degree angle or bottom of said substantially L shaped tool. Said decoupling tool further comprises a first 102 and second 104 surface corresponding to the left and right sides respectively or the surface not contained within the angles of said L-shaped tool 84 and substantially perpendicular to said inner 106 and outer surfaces 108. Said decoupling tool 84 further comprises said lever end 110 corresponding to the vertical segment of the L shape, of sufficient length to allow the operator to apply adequate force against said pipe coupler bridge 80 to cause decoupling, and of sufficient length to allow the operator to extract the decoupled pipe component without physically entering the tank. In the preferred embodiment, said lever end 110 further comprises one or more eyes or holes 112 along its length, passing through said first 102 and second 104 surfaces for the purpose of accepting one or more said handles 114. In the preferred embodiment, said handles 114 are comprised of a simple rigid rod, preferably steel, of sufficient length to allow gripping. One of ordinary skill in the art would appreciate that handles of a number of different shapes and attachment methods may be utilized.

Said decoupling tool further comprises a decoupling end 120 corresponding to the substantially horizontal segment of said L-shaped tool 84 of sufficient length to be inserted into said pipe coupler orifice 51. As shown in detail in the Figures, said decoupling end 120 further comprises said window 122 on said inner surface 106 of sufficient size to allow said strap member retainer 124 to extend beyond said inner surface 106, but small enough to retain said ball 128. Said decoupling end 120 also comprises said pivot points 126 distal to said window 122, preferably comprised of holes through said first 102 and second 104 surfaces, of sufficient diameter to accept said strap member retainer 124 pivot elements 125. Said strap member retainer 124 is preferably comprised of a rigid spring steel material but may comprise a plurality of other materials or forms. As shown in the Figures, said strap member retainer 124 is substantially "V" or "U" shaped, containing pivot elements 125 at the ends.

Contained within said decoupling end 120 is said ball 128 of substantial weight such that when said decoupling tool 84 is canted during use, said ball 128 will roll against said strap member retainer 124 pushing said strap member retainer 124 to an extended position. Said strap member retainer 124, once extended, will prevent said pipe coupler insertion portion 12 or strap member 50 from slipping off said decoupling tool 84 and further allows an operator to securely extract said supply pipe. Said ball guard 131 mounts via a fastener with or within said tubular structure and covers any opening in said tubular structure of said decoupling end 120 flattened outer surface 108 whereby said ball 128 is prohibited from protruding and interfering with the decoupling process.

In the preferred embedment, said decoupling tool 84 may be manufactured from tubular steel of sufficient length and formed substantially into the shape of an "L". Before or after forming, said eyes 112 and said pivot points 126 may be may be formed or drilled in first 102 and second 104 surfaces of said lever end 110, and said decoupling end 120 respectively. Before or after forming, said window 122 may be formed or cut in said inner surface 106 of said decoupling end 120. Said ball 128 may be inserted into said distal end 130 subsequent to cutting said window 122. Subsequent to inserting said ball 128, said strap member retainer 124 may be compressed and inserted into said decoupling end 120 and allowed to expand into said pivot points 126. Said strap member retainer 124 is orientated such that, when pivoted through said window 122 it protrudes away from yet pointing towards said lever end. Said handles 114 may be cut from steel bar stock, and inserted into said eyes 112 as desired during operation. Further alternative embodiments may utilize any manner of mechanisms to activate said strap member retainer 124 including but not limited to springs, levers, counter weighs, push rods or cables.

Further alternative embodiments of said coupler 10 incorporate a latching mechanism which ensures a positive locking of the insertion portion 12 with the housing portion 52 and minimizes the possibility of decoupling. Said latching mechanism is especially useful when the coupler 10 is utilized in an inverted position and/or in applications such as conventional plumbing systems and swimming pools. Said latching mechanism comprises a latch assembly 132 which mates or substantially fits with a latch cavity 156 within said housing portion 52 and engages with an engagement indent 162 in said insertion portion 12 whereby positive locking is obtained. Said latch assembly 132 comprises a latch button 134 which extends from said latch cavity 156 within said bridge 80 and also extends from said opening 48 and into said depression 46 when assembled. When depressed with said removal or decoupling tool 84, said button 134 unlatches said insertion portion from said housing portion 52. Alternative embodiments may place said latch button 134 in a plurality of locations other than said bridge 80 provided said button 134 may be activated or depressed during separation.

In a preferred embodiment, the latch assembly 132 incorporates a button arm 136 attached with said latch button 134 which engages with a latch pin 142 tapered slot 144 in order to move said latch pin 142 in and out of engagement with said engagement indent 162. That is, said button arm 136 is slightly tapered and engages a tapered surface in said tapered slot 144 as said button 134 is pushed or depressed further into said latch cavity 156, thereby moving said latch pin 142 substantially perpendicular to said button 134 movement. As moved, said latch pin 142 disengages with the engagement indent 162 and allows separation of the insertion portion 12 and the housing portion 52. Said latch button 134 further incorporates one or more spring retainers 138 which hold one or more springs 140 which bear onto a base of said latch cavity 156. Said springs 140 assure positive retraction of said latch button 134 when not depressed.

Said latch pin 142 has an engagement end 146 which engages said engagement indent 162 through sliding movement and retention within the latch pin hole 158 in said housing 52 and a guide end 150 of reduced diameter or dimension which is slidably held with the guide end hole 160 of the housing portion 52. Said engagement end 146 preferably has a bevel 148 nearest said top side 76 which easily allows said insertion portion 12 to slide past and engage with said latch pin 142. In a preferred alternative embodiment, the insertion portion 12 has a clearance notch 164 for said latch pin guide end 150 which protrudes from said guide end hole 160 of said housing portion 52. The latch pin 142 is of a length that when fully engaged with or into the engagement indent 162, there will be no protrusion of the latch pin guide end 150 into the clearance notch 164. Said notch further acts as a sight window for determination of whether said latch pin 142 is engaged or not engaged fully with or into the engagement indent 162. In a further alternative embodiment, a portion of said latch pin guide end 150 is painted a bright color for easy viewing.

Preferably a flexible retainer 152 and retainer washer 154 are placed upon said guide end 150 of said latch pin 142 in order to provide a force upon said latch pin 142 whereby said engagement end is maintained extended or engaged when said latch button 134 is not depressed. Said flexible retainer 152 may comprise a spring, compressible rubber or foam material, or other mechanical elements which maintain an engagement force. Further alternative embodiments may utilize a plurality of latch mechanisms or assemblies in order to assure a positive and secure mating of the insertion portion 12 and the housing portion 52.

In operation, the user connects a first pipe with the insertion portion 12 and a second pipe with the housing portion 52 of the coupler 10. (i.e. first pipe coupling portion 16 and second pipe coupling portion 58 respectively) For many anticipated applications as described, an elbow is often connected with said first pipe which further connects with a supply pipe and thereafter a pump. That is, said insertion portion 12, first pipe, elbow, supply pipe, and pump form a single interconnected unit. Again, for many anticipated applications as described, said second pipe is fed through a wall of a housing, often a septic or sump tank or well casing but not limited to such, in which said coupler 10 is located. Again, this forms a single interconnected unit with said housing portion 52. Upon placement and assembly of the aforesaid, the interconnected insertion portion 12 unit is mated with said housing portion 52 to form the sealing coupler 10. In the preferred form, said mating is gravitationally assisted and continuously maintained by the mass of said interconnected insertion portion 12 unit forcing said insertion portion 12 downward into said housing portion 52 from the top side 76 insertion opening 77 toward said channel vertex 63. The alternative embodiment utilizing the latch mechanism or assembly 132 may be placed in positions where gravitational assistance is not required. The removal tool 84 may be utilized to place and insert said insertion portion 12 or said insertion portion 12 may be placed and inserted via a plurality of means, including but not limited to manual placement.

Should the user desire to separate the coupler 10, he or she inserts the L-shaped extension or decoupling end 120 of the removal tool 84 into said orifice 51 and slightly cants the shaft 86 thereof. The relative force between the strap member 50 and the bridge 80 "pops" or separates the double taper of the flange 26 and channel 78. This initial separation requires only a minimal displacement before the force due to the channel 78 width taper and flange 26 width 28 taper remove the substantially orthogonal force upon the O-ring or elastomeric gasket 38. For the alternative embodiment, the latch button 134 is depressed by said removal or decoupling tool 84 and the separation proceeds as described. Once this orthogonal force is relieved, separation force between the portions 12, 52 is substantially limited to the weight of the single interconnected insertion portion unit. That is, the vertical vectorial force component contributed by the dynamic frictional coefficient between said elastomeric gasket 38 and second face 74 due to said orthogonal force is substantially zero. This phenomena is unique to the present art slip fit pipe coupler 10 and obviates the nuisance and limitations of the prior art. That is, with the prior art, in addition to the weight of the pump and pipe(s), substantial additional force must be used to overcome the elastomeric gasket frictional force contribution.

Once separated, the user pulls the removal tool 84 shaft 86 and single interconnected insertion portion 12 unit from the sump, tank, or casing. The aforesaid method is typically performed within less than a minute with a minimum of effort. Prior art coupler separation typically requires pipe threading or un-threading which may take many minutes, hours, or even days of labor.

Those skilled in the art will appreciate that a slip fit quick disconnect pipe coupler 10, a unique decoupling tool for decoupling said coupler, and a method of use of the aforesaid has been shown and described and that said present art is capable of easily and repeatedly coupling and decoupling two or more pipes with an assured hydrostatic seal and extracting the decoupled component. The device with its unique design and structure along with its method of use fulfills a long felt but yet unfilled need within the arts described herein. The present art and its method of use provides a desired solution to the prior art coupling, separation, and choice of material limitations.

Having described the invention in detail, those skilled in the art will appreciate that modifications may be made to the invention and its method of use without departing from the spirit herein identified. Therefore, it is not intended that the scope of the invention be limited to the specific embodiments illustrated and described. Rather, it is intended that the scope of this invention be determined by the appended claims and their equivalents.

What is claimed is:

1. A slip fit quick disconnect pipe coupler comprising:
an insertion portion and a housing portion; and
said insertion portion having a front side having an overhanging lip and a first face having a gasket, a rear side having a first pipe coupling portion, a right side, a left side, a top side having an opening and a strap member forming at least a partial orifice substantially near and between said opening and said strap member, a bottom side, and a flange at said left and right sides having a width which substantially decreasingly tapers from proximately near said top side to near said bottom side; and said housing portion having a front side having a second pipe coupling portion, a rear side having a second face of a form capable of substantially mating with said first face with said gasket there between, a right side, a left side, a top side having an insertion opening and capable of accepting said flange, a bottom side, a bridge between said front side and said insertion opening capable of mating with said overhanging lip, and one or more channels having one or more tapers in width which substantially conform with at least a portion of said flange; and when said insertion portion flange is mated with said channel said gasket is compressed between a substantial mating of said first face and said second face, whereby an assured seal is provided between said first pipe coupling portion and said second pipe coupling portion and a decoupling or removal tool may be placed within said orifice between said strap member and said bridge to separate said insertion portion and said housing portion.

2. The slip fit quick disconnect pipe coupler as described in claim 1, further comprising:

said decoupling or removal tool comprising a lever end shaft and a decoupling end L-shaped extension whereby said decoupling end is sized to fit within said orifice.

3. The slip fit quick disconnect pipe coupler as described in claim 2, whereby said decoupling or removal tool further comprises:

a window within said decoupling end of sufficient size to allow a strap member retainer to extend therefrom; and a ball within said decoupling end which rolls against said strap member retainer when said decoupling end is canted and pushes said strap member retainer to an extended position and prevents said pipe coupler strap member from slipping off said decoupling tool.

4. The slip fit quick disconnect pipe coupler as described in claim 1, further comprising:

a latching mechanism which ensures a positive locking of the insertion portion with the housing portion and minimizes the possibility of decoupling.

5. The slip fit quick disconnect pipe coupler as described in claim 4 further comprising:

a latch assembly within a latch cavity within said housing portion, said latch assembly having a latch button capable of extending from said latch cavity and said opening and capable of being depressed with said decoupling or removal tool.

6. The slip fit quick disconnect pipe coupler as described in claim 5 further comprising:

a button arm mounted with said latch button and one or more springs substantially between said latch button and said latch cavity; and a latch pin having an engagement end slidingly retained within a latch pin hole within said housing and said latch pin further having a tapered slot into which said button arm engages and moves said latch pin when said button arm is depressed; and an engagement indent within said insertion portion which engages with said engagement end.

7. The slip fit quick disconnect pipe coupler as described in claim 6 further comprising:

a bevel on said engagement end which easily allows said insertion portion to slide past and engage with said latch pin; and a guide end on said latch pin slidably held within a guide end hole within said housing portion; and a flexible retainer on said guide end which provides a force upon said latch pin whereby said engagement end is maintained extended when said latch button is not depressed.

8. The slip fit quick disconnect pipe coupler as described in claim 1, whereby:

said first face in combination with said flange comprises a tapered breadth; and said channel having a tapered breadth from proximately near the left side of said housing portion and said right side of said housing portion and substantially corresponding to said tapered breadth of said flange.

9. The slip fit quick disconnect pipe coupler as described in claim 1 whereby:

said channel is substantially continuous from substantially near said top side proximately near said left side to substantially near said top side proximately near said right side of said housing and substantially conforming to said flange.

10. The slip fit quick disconnect pipe coupler as described in claim 1 further comprising:

a groove in said first face within which is mounted said gasket.

11. The slip fit quick disconnect pipe coupler as described in claim 1 further comprising:

a topside indent within said front side and top side of said housing portion whereby said bridge is located between said topside indent and said channel; and a recess contained with said overhanging lip into which said bridge of said housing portion fits and mates, whereby said housing and insertion portion substantially lock together.

12. The slip fit quick disconnect pipe coupler as described in claim 1 further comprising:

a depression on said top side of said insertion portion, said depression in conjunction with said strap member forming said orifice; and said opening allowing said bridge of said housing portion to partially extend into said depression.

13. The slip fit quick disconnect pipe coupler as described in claim 1 further comprising:

at least one of said first pipe coupling portion or said second pipe coupling portion is threaded.

14. A slip fit quick disconnect pipe coupler comprising:

an insertion portion and a housing portion; and said insertion portion having a front side having an overhanging lip containing a recess and a first face having a groove and an elastomeric gasket; and said insertion portion having a rear side having a first pipe coupling portion, a right side, a left side, and a bottom side; and said insertion portion having a top side having a depression and an opening in said depression and a strap member forming at least a partial orifice between said depression and said strap member; and a substantially continuous flange substantially from said left side through said bottom side to said right side having a width and a breadth, at least one of which substantially decreasingly tapers from proximately near said top side to near said bottom side; and said flange substantially having a shoulder which contacts and mates with a lip within a channel of said housing portion; and said housing portion having a top side having an insertion opening capable of accepting said flange and a topside indent and a bridge capable of mating with said overhanging lip and said recess respectfully; and said housing portion having a right side, a left side, a bottom side, and a front side having a second pipe coupling portion and said topside indent; and said housing portion having a rear side having a second face of a form capable of substantially mating with said first face with said gasket there between; and said channel of said housing portion is substantially attached with said rear side and is substantially continuous having said lip and a taper in width and breadth which substantially conform with said flange when said bottom side of said flange is inserted into said insertion opening and into said channel; and when said insertion portion flange is mated with said channel said bridge at least partially extends into said insertion portion depression or orifice through said insertion portion opening and said gasket is compressed between a substantial mating of said first face and said second face, whereby an assured seal is provided between said first pipe coupling portion and said second pipe coupling portion and a decoupling or removal tool may be placed within said orifice between said strap member and said bridge to separate said insertion portion and said housing portion.

15. The slip fit quick disconnect pipe coupler as described in claim 14 further comprising:

one or more threads on said first or second pipe coupling portions.

16. The slip fit quick disconnect pipe coupler as described in claim 14 further comprising:

a latch mechanism comprising a latch assembly within said housing portion and an engagement indent within said insertion portion; and said latch assembly having a latch button which moves a latch pin having an engagement end into and out of engagement with said engagement indent; and said button at least partially within said depression of said insertion portion when said insertion portion is assembled with said housing portion.

17. The slip fit quick disconnect pipe coupler as described in claim 16 further comprising:

a latch cavity substantially within said bridge into which said latch assembly substantially fits; and one or more latch pin holes within said bridge from which said latch pin slidably protrudes; and one or more springs within said latch cavity whereby said latch button is positively retracted and said latch pin retains engagement with said engagement indent if said engagement button is not depressed.

18. The slip fit quick disconnect pipe coupler as described in claim 14 further comprising:

said decoupling or removal tool comprising a shaft having a L-shaped extension with a lever end and a decoupling end.

19. The slip fit quick disconnect pipe coupler as described in claim 18 further comprising:

a window within said decoupling end; and a strap member retainer within said decoupling end having a portion smaller than said window which is capable of extending from said window and having pivot elements pivotally mounted with pivot points with said decoupling end; and a ball within said decoupling end which when said decoupling end is canted causes at least a portion of said strap member retainer to extend through said window whereby said decoupling end is prevented from slipping off said insertion portion when canted within said orifice.

20. The slip fit quick disconnect pipe coupler as described in claim 18 further comprising:

one or more eyes within said lever end; and a handle within one of said eyes whereby said handle aids in applying addition force or assists in extracting after decoupling.

* * * * *